(12) United States Patent
Vanderveld et al.

(10) Patent No.: US 11,188,940 B1
(45) Date of Patent: Nov. 30, 2021

(54) METHOD, APPARATUS, AND COMPUTER PROGRAM FOR PREDICTING CONSUMER BEHAVIOR

(71) Applicant: Groupon, Inc., Chicago, IL (US)

(72) Inventors: Riva Ashley Vanderveld, Chicago, IL (US); Angela Han, Chicago, IL (US); Rajesh Girish Parekh, San Jose, CA (US)

(73) Assignee: Groupon, Inc., Chicago, IL (US)

( * ) Notice: Subject to any disclaimer, the term of this patent is extended or adjusted under 35 U.S.C. 154(b) by 870 days.

(21) Appl. No.: 15/253,665

(22) Filed: Aug. 31, 2016

Related U.S. Application Data

(60) Provisional application No. 62/212,758, filed on Sep. 1, 2015.

(51) Int. Cl.
 *G06Q 30/02* (2012.01)
 *G06N 20/00* (2019.01)

(52) U.S. Cl.
 CPC ......... *G06Q 30/0255* (2013.01); *G06N 20/00* (2019.01)

(58) Field of Classification Search
 None
 See application file for complete search history.

(56) References Cited

U.S. PATENT DOCUMENTS

| | | | |
|---|---|---|---|
| 2006/0143071 A1* | 6/2006 | Hofmann | G06Q 30/02 705/7.34 |
| 2007/0156515 A1* | 7/2007 | Hasselback | G06Q 30/0226 705/14.27 |
| 2009/0259518 A1* | 10/2009 | Harvey | G06Q 40/00 705/7.29 |
| 2013/0110895 A1* | 5/2013 | Valentino | G06F 7/588 708/255 |
| 2015/0039388 A1* | 2/2015 | Rajaraman | G06Q 30/0222 705/7.29 |
| 2015/0356570 A1* | 12/2015 | Goldsmid | G06Q 30/0201 705/7.29 |
| 2016/0134577 A1* | 5/2016 | Owens | G06F 16/9535 709/206 |

OTHER PUBLICATIONS

Kulkarni et al., "Pruning of Random Forest Classifiers: A Survey and Future Directions," 2012 International Conference on Data Science & Engineering (ICDSE), Cochin, India, 2012, pp. 64-68, doi: 10.1109/ICDSE.2012.6282329 (Year: 2012).*

* cited by examiner

*Primary Examiner* — Christopher B Tokarczyk
(74) *Attorney, Agent, or Firm* — Alston & Bird LLP

(57) ABSTRACT

Embodiments of the present invention provide methods, systems, apparatuses, and computer program products for predicting consumer behavior. In one embodiment a method is provided comprising determining a classification for a first consumer, wherein the classification is based on a measure of frequency of purchases by the first consumer; identifying one or more first attributes for the first consumer based on the determined classification, the one or more attributes being attributes selected for predicting the respective one or more metric associated with the first consumer; and determining, based on values for the one or more first attributes, a first prediction value that indicates a programmatically expected number of purchases by the first consumer.

20 Claims, 12 Drawing Sheets

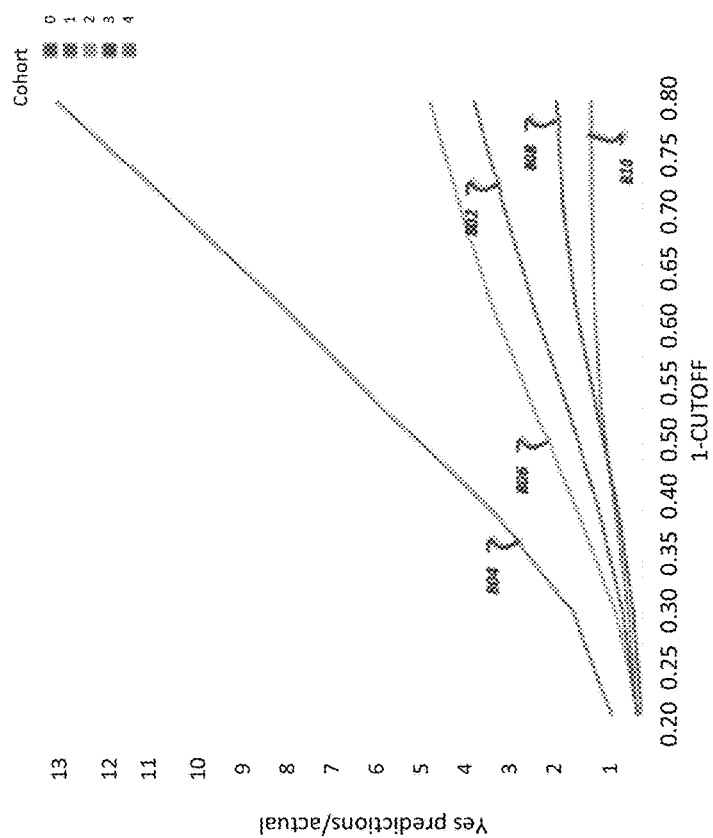

Cohort 1

| Stage 1 | Stage 2 |
|---|---|
| Attribute Rankings | Attribute Rankings |
| es_email | goods_cohort |
| goods_cohort | days_since_order |
| days_since_order | ords_per_sub |
| app_cohort | n_emails_send |
| n_emails_send | days_to_order |

FIG. 11A

Cohort 2

| Stage 1 | Stage 2 |
|---|---|
| Attribute Rankings | Attribute Rankings |
| days_since_order | days_since_order |
| es_email | goods_cohort |
| gb_life | n_deals |
| n_emails_send | n_hero_deals |
| days_to_order | gb_1yr |

FIG. 11B

Cohort 3

| Stage 1 | | Stage 2 | |
|---|---|---|---|
| | Attribute Rankings | | Attribute Rankings |
| | gb_life | | gb_life |
| | days_since_order | | gb_1yr |
| | gb_1yr | | pct_redeemed |
| | es_email | | city_dist |
| | avg_days_between | | n_deals |

FIG. 11C

Cohort 4

| Stage 1 | | Stage 2 | |
|---|---|---|---|
| | Attribute Rankings | | Attribute Rankings |
| | days_since_order | | gb_1yr |
| | gb_qtr | | gb_life |
| | gb_life | | gb_qtr |
| | gb_1yr | | days_since_order |
| | avg_days_between | | avg_days_between |

FIG. 11D

METHOD, APPARATUS, AND COMPUTER PROGRAM FOR PREDICTING CONSUMER BEHAVIOR

CROSS REFERENCE TO RELATED APPLICATIONS

The present application claims the benefit of priority to U.S. Provisional Application No. 62/212,758, titled "Method, Apparatus, and Computer Program Product for Predicting Consumer Behavior" filed Sep. 1, 2015, the contents of which are hereby incorporated by reference in their entirety.

BACKGROUND

A promotional and marketing service may utilize the internet to provide consumers with available promotions related to products, services or experiences offered by providers that may be of interest. Applicant has identified a number of deficiencies and problems associated with assessing and analyzing consumers. Through applied effort, ingenuity, and innovation, many of these identified problems have been solved by developing solutions that are included in embodiments of the present invention, many examples of which are described in detail herein.

BRIEF SUMMARY

This specification relates to assessing and analyzing consumers based on a machine learning model.

In general, one innovative aspect of the subject matter described in this specification can be embodied in methods that include the actions of receiving data associated with a first consumer of the plurality of consumers; determining, a classification for the first consumer, wherein the classification is based on a measure of frequency of purchases by the first consumer; identifying, one or more first attributes for the first consumer based on the determined classification, the one or more attributes being attributes selected for predicting the respective one or more metrics associated with the first consumer; and determining, based on values for the one or more first attributes, a first prediction value that indicates a programmatically expected number of future purchases by the first consumer.

Other embodiments of this aspect include corresponding systems, apparatus, and computer programs, configured to perform the actions of the methods, encoded on computer storage devices.

These and other embodiments can each optionally include one or more of the following features. Receiving data associated with a second consumer from the plurality of consumers, the second consumer being different from the first consumer; determining, a classification for the second consumer, wherein the classification is based on a measure of frequency of purchases by the first consumer, and wherein the classification of the second consumer is different from the classification of the first consumer; identifying, one or more second attributes for the second consumer based on the determined classification for the second consumer, the one or more second attributes being attributes selected for predicting the respective one or more metrics associated with the second consumer, and wherein the classification of the second consumer is different from the classification of the first consumer; Determining, based on values for the one or more second attributes, a second prediction value that indicates a programmatically expected number of future purchases by the second consumer, wherein the second prediction value is different from the first prediction value. Applying a decay factor to the first prediction value, the first decay factor being a factor that proportionally reduces the first prediction value, wherein the first decay factor is determined based on a measure of time lapsed between a time of the determination of the first prediction value and a time when the decay factor is applied; Receiving updated first values for the one or more first attributes; determining that a first event associated with the first consumer occurred; in response to determining that the first event occurred, determining based on the updated first values for the one or more first attributes, an updated prediction value that indicates an updated programmatically expected number of purchases by the first consumer. Determining, based on values of third attributes different from the first attributes, a third prediction specifying whether the first consumer accessing a computing device will make a purchase within a pre-specified time period, wherein the determining of the first prediction value is in response to determining that third prediction indicates that the consumer, using the computing device, will make a purchase within the pre-specified time period. Delivering an advertisement to the first consumer using a first computing device and not providing an advertisement to the second consumer using a second computing device, based, at least in part, on the first prediction and the second prediction. Providing advertisements to the first consumer using the first computing device at a different rate from providing advertisements to the second consumer using the second computing device, based, at least in part, on the first prediction and the second prediction.

In general, another aspect of the subject matter described in this specification can be embodied in methods that include the actions of receiving data for a first consumer of the plurality of consumers; determining, a classification for the first consumer, wherein the classification is based on a measure of frequency of purchases by the first consumer; identifying, a set of attributes for the first consumer based on the determined classification, the set of attributes being attributes selected, for the classification of consumers, for predicting the respective one or more metric associated with consumers classified with the classification; selecting from the set of attributes a first subset of attributes and a second subset of attributes, wherein the first subset of attributes is different from the second subset of attributes; determining, based on values for the first subset of attributes, a first prediction value that indicates whether the first consumer will make a purchase within a pre-specified time period; determining, based on values for the second subset of attributes, a second prediction value that indicates whether the first consumer will make a purchase within a pre-specified time period; and determining, an overall prediction based at least in part on the first and second predictions.

Other embodiments of this aspect include corresponding systems, apparatus, and computer programs, configured to perform the actions of the methods, encoded on computer storage devices.

In general, another aspect of the subject matter described in this specification can be embodied in methods that include the actions of receiving data associated with a first consumer of the plurality of consumers; determining, a classification for the first consumer, wherein the classification is based on a measure of frequency of purchases by the first consumer; identifying, a set of attributes for the first consumer based on the determined classification, the set of attributes being attributes selected, for the classification of consumers, for predicting the respective one or more metric associated with consumers classified with the classification; selecting from the set of attributes a first subset of attributes and a second subset of attributes, wherein the first subset of attributes is different from the second subset of attributes; determining, based on values for the first subset of attributes, a first prediction value that indicates a programmatically expected number of purchases by the first consumer; determining, based on values for the second subset of attributes, a second prediction value that indicates a programmatically expected number of purchases by the first consumer; determining, an overall prediction based at least in part on the first and second predictions.

Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. Provide accurate and efficient methods and systems for predicting purchases by consumers during a pre-specified period. In turn, the predictions may be used to enhance, optimize and adjust marketing and advertising efforts. Reduce the cost associated with marketing and advertising efforts that are unlikely to result in purchases and, in turn, increase the overall revenue. Reduce the required processing power for servers maintaining and provisioning the promotions. Similarly, reduction of the required processing power increases the overall revenue. Particular embodiments of the subject matter allow for providing consumers with highly relevant promotions and advertisements at a rate that may yield a maximized number of conversions and purchases. Particular embodiments of the subject matter facilitate analyzing events that may affect consumer value, in order to determine various metrics that can aid in optimizing business practices and aid in product experimentation. Additionally, particular embodiments of the subject matter allow for customized treatment of consumers based on a predicted consumer value.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Figure 1:
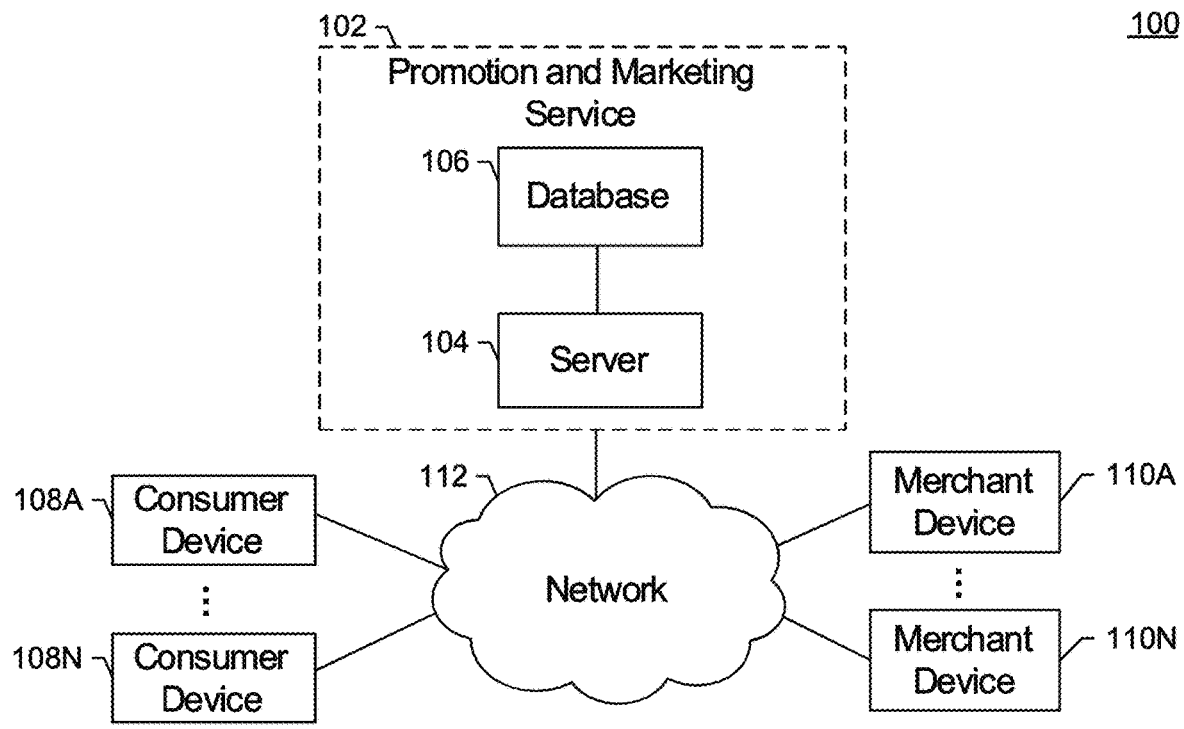
Figure 2:
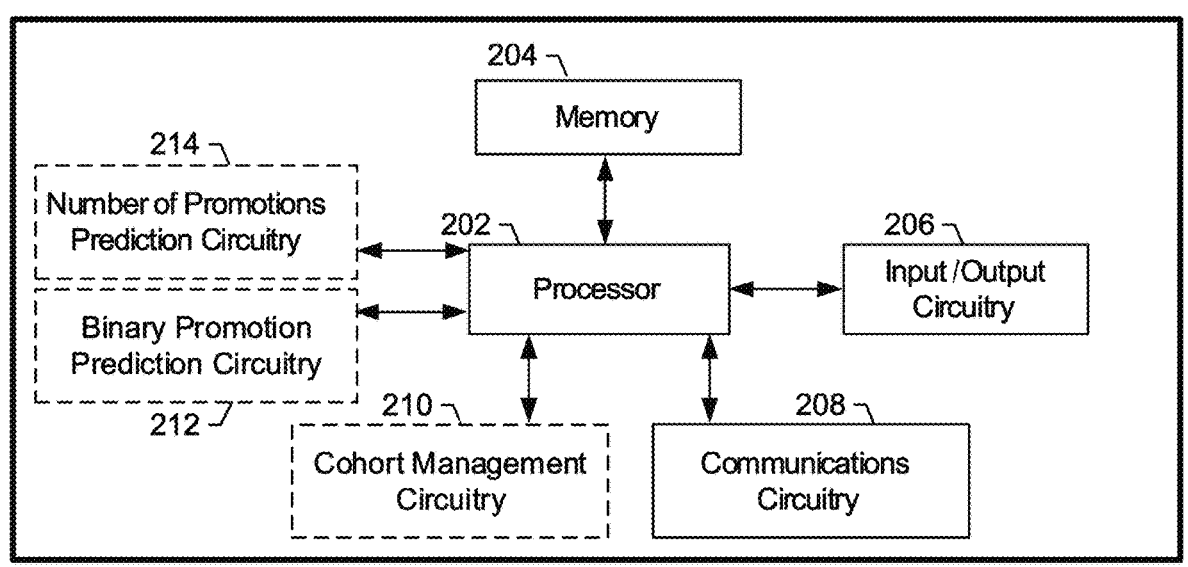
Figure 3:
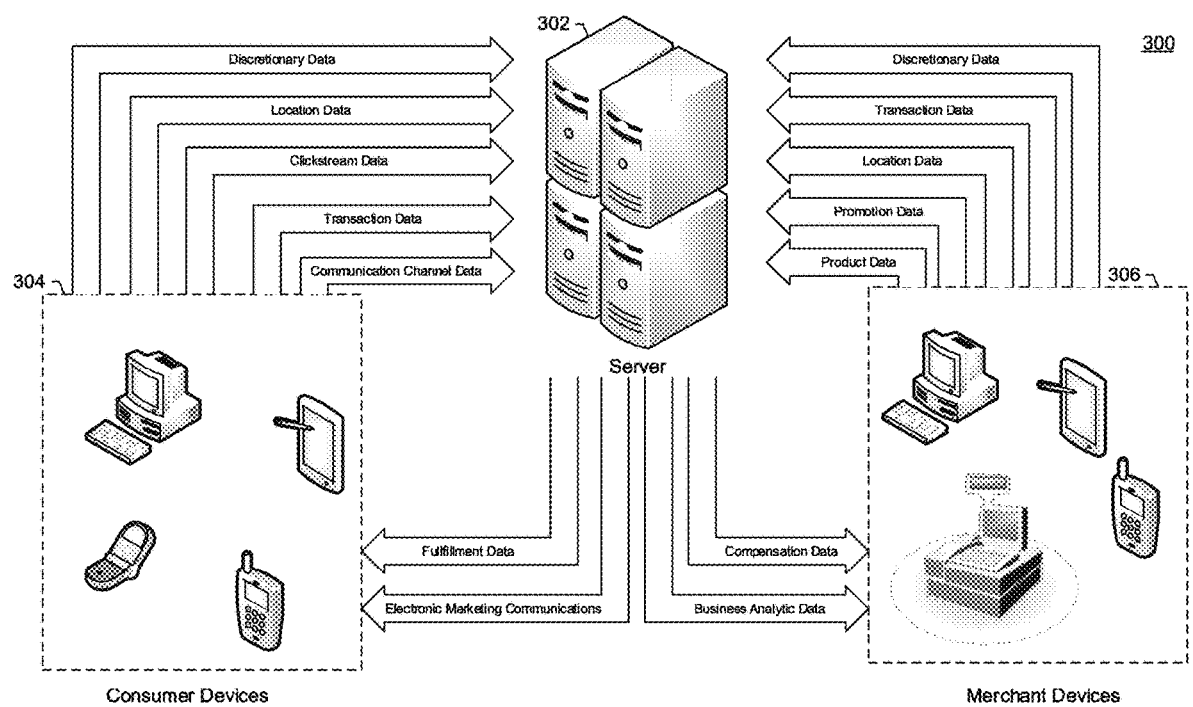

Having thus described the invention in general terms, reference will now be made to the accompanying drawings, which are not necessarily drawn to scale, and wherein:

FIG. 1 is an overview of an example system that can be used to practice embodiments of the present invention;

FIG. 2 is an exemplary schematic diagram of a computing entity according to one embodiment of the present invention;

FIG. 3 is an exemplary data flow illustrating interactions between a server, one or more consumer devices, and one or more merchant devices;

FIGS. 4-7, 9A-9B and 10A-10B are flow charts illustrating various procedures and operations that may be completed in accordance with various embodiments of the present invention;

FIG. 8A depicts an example graphical representation of a measure of prediction accuracy against a configurable cutoff attribute for different cohorts;

FIG. 8B shows a list of statistical data associated with different cohorts.

FIGS. 11A-11D show a list of example attributes, for predicting consumer behavior, and an associated ranking indicating a measure of importance of each attribute for a plurality of cohorts;

DETAILED DESCRIPTION OF VARIOUS EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Overview

Various embodiments of the invention generally relate to predicting consumer behavior. For example, the methods, apparatus and computer program products described herein are operable to determine whether a consumer is likely to make a purchase and/or a number of purchases that the consumer is likely to make. A purchase may be, for example, accepting a promotion. Consumers are divided into different cohorts based on historical data associated with the consumers. For example, consumers that make frequent purchases may belong to a cohort different from a cohort to which consumers that make seldom purchases belong. In one example, a different set of attributes may be used to predict consumer behavior of consumers belonging to different cohorts. Similarly, in some implementations, a first set of attributes may be used to predict whether a particular consumer will make a purchase within a pre-specified time period, while a second set of attributes may be used to predict the number of purchases that will be made by the particular consumer.

Because analysis shows that different attributes have different importance in predicting consumer behavior for consumers belonging to different cohorts, a promotion and marketing service can access, capture and/or store data related to consumers belonging to different cohorts and utilize that information to determine likely return rates of promotions and advertisements.

In one example, a promotion and marketing system may supply a data set to a learning machine or algorithm. The learning machine or algorithm may then determine which features or attributes of consumers belonging to different cohorts correlate to a number of purchases. Accordingly, the learning machine may select a subset of features or attributes for training associated with each cohort. Similarly, the learning machine may select a subset of features or attributes for training associated with different predictions for a particular cohort. For example, different features or attributes may be used for training a system predicting a number of purchases and for training a system for predicating whether a purchase will be made within a pre-specified time period. Once the learning machine or algorithm is trained, live data associated with other consumers may be input and the learning machine or algorithm may then predict the behavior of the other consumers. As such, the promotion and marketing system may determine how to adjust, for example, advertisement targeting and marketing efforts. Alternatively, or additionally, in some example embodiments, the learning machine or algorithm may output a prediction specifying a number of purchases likely to be made from a particular promotion and marketing service or seller during a pre-specified period. This enables sellers to adjust, for example, their marketing strategy, number of employees, budgets and/or the like.

Definitions

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and that is operable to provide promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer or a promotion, participate in redemption, generate rewards, provide a point of sale device or service, issue payments to providers and/or otherwise participate in the exchange of goods, services or experiences for currency, value and/or the like. The service is also, in some example embodiments, configured to offer merchant services such as promotion building (e.g., assisting merchants with selecting parameters for newly created promotions), promotion counseling (e.g., offering information to merchants to assist with using promotions as marketing), promotion analytics (e.g., offering information to merchants to provide data and analysis regarding the costs and return-on-investment associated with offering promotions), and the like.

As used herein, the terms "provider" and "merchant" may be used interchangeably and may include, but are not limited to, a business owner, consigner, shopkeeper, tradesperson, vendor, operator, entrepreneur, agent, dealer, organization or the like that is in the business of providing a good, service or experience to a consumer, facilitating the provision of a good service or experience to a consumer and/or otherwise operating in the stream of commerce. The "provider" or "merchant" need not actually market a product or service via the promotion and marketing service, as some merchants or providers may utilize the promotion and marketing service only for the purpose of gathering marketing information, demographic information, or the like.

As used herein, the term "consumer" should be understood to refer to a recipient of goods, services, promotions, media, or the like provided by the promotion and marketing service and/or a merchant. Consumers may include, without limitation, individuals, groups of individuals, corporations, other merchants, and the like.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. Promotions may have different values in different contexts. For example, a promotion may have a first value associated with the cost paid by a consumer, known as an "accepted value." When redeemed, the promotion may be used to purchase a "promotional value" representing the retail price of the goods. The promotion may also have a "residual value," reflecting the remaining value of the promotion after expiration. Although consumers may be primarily focused on the accepted and promotional value of the promotion, a promotion may also have additional associated values. For example, a "cost value" may represent the cost to the merchant to offer the promotion via the promotion and marketing service, where the promotion and marketing service receives the cost value for each promotion sold to a consumer. The promotion may also include a "return on investment" value, representing a quantified expected return on investment to the merchant for each promotion sold.

For example, consider a promotion offered by the promotion and marketing service for a $50 meal promotion for $25 at a particular restaurant. In this example, $25 would be the accepted value charged to the consumer. The consumer would then be able to redeem the promotion at the restaurant for $50 applied toward their meal check. This $50 would be the promotional value of the promotion. If the consumer did not use the promotion before expiration, the consumer might be able to obtain a refund of $22.50, representing a 10% fee to recoup transaction costs for the merchant and/or promotion and marketing service. This $22.50 would be the residual value of the promotion. If the promotion and marketing service charged the merchant $3.00 to offer the promotion, the $3.00 fee would be the "cost value." The "return on investment" value of the promotion might be dynamically calculated by the promotion and marketing service based on the expected repeat business generated by the marketing of the promotion, the particular location, the demographics of the consumer, and the like. For example, the return on investment value might be $10.00, reflecting the long term additional profit expected by the merchant as a result of bringing in a new customer through use of a promotion.

Promotions may be provided to consumers and redeemed via the use of an "instrument." Instruments may represent and embody the terms of the promotion from which the instrument resulted. For example, instruments may include, but are not limited to, any type of physical token (e.g., magnetic strip cards or printed barcodes), virtual account balance (e.g., a promotion being associated with a particular user account on a merchant website), secret code (e.g., a character string that can be entered on a merchant website or point-of-sale), tender, electronic certificate, medium of exchange, voucher, or the like, which may be used in a transaction for at least a portion of the purchase, acquisition, procurement, consumption or the like of goods, services and/or experiences as defined by the terms of the promotion.

In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned restaurant as the example provider, an electronic indication in a mobile application that shows $50 of value to be used as payment for a meal check at the restaurant. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "redemption" refers to the use, exchange or other presentation of an instrument for at least a portion of a good, service or experience as defined by the instrument and its related promotion. In some examples, redemption includes the verification of validity of the instrument. In other example embodiments, redemption may include an indication that a particular instrument has been redeemed and thus no longer retains an actual, promotional and/or residual value (e.g., full redemption). In other example embodiments, redemption may include the redemption of at least a portion of its actual, promotional and/or residual value (e.g., partial redemption). An example of redemption, using the aforementioned restaurant as the example provider, is the exchange of the $50 instrument and $50 to settle a $100 meal check.

As used herein, the term "impression" refers to a metric for measuring how frequently consumers are provided with marketing information related to a particular good, service, or promotion. Impressions may be measured in various different manners, including, but not limited to, measuring the frequency with which content is served to a consumer (e.g., the number of times images, websites, or the like are requested by consumers), measuring the frequency with which electronic marketing communications including particular content are sent to consumers (e.g., a number of e-mails sent to consumers or number of e-mails including particular promotion content), measuring the frequency with which electronic marketing communications are received by consumers (e.g., a number of times a particular e-mail is read), or the like. Impressions may be provided through various forms of media, including but not limited to communications, displays, or other perceived indications, such as e-mails, text messages, application alerts, mobile applications, other types of electronic interface or distribution channels and/or the like, of one or more promotions.

As used herein, the term "electronic marketing information" refers to various electronic data and signals that may be interpreted by a promotion and marketing service to provide improved electronic marketing communications. Electronic marketing information may include, without limitation, clickstream data (defined below), transaction data (defined below), location data (defined below), communication channel data (defined below), discretionary data (defined below), or any other data stored by or received by the promotion and marketing service for use in providing electronic communications to consumers.

As used herein, the term "clickstream data" refers to electronic information indicating content viewed, accessed, edited, or retrieved by consumers. This information may be electronically processed and analyzed by a promotion and marketing service to improve the quality of electronic marketing and commerce transactions offered by, through, and in conjunction with the promotion and marketing service. It should be understood that the term "clickstream" is not intended to be limited to mouse clicks. For example, the clickstream data may include various other consumer interactions, including without limitation, mouse-over events and durations, the amount of time spent by the consumer viewing particular content, the rate at which impressions of particular content result in sales associated with that content, demographic information associated with each particular consumer, data indicating other content accessed by the consumer (e.g., browser cookie data), the time or date on which content was accessed, the frequency of impressions for particular content, associations between particular consumers or consumer demographics and particular impressions, and/or the like.

As used herein, the term "transaction data" refers to electronic information indicating that a transaction is occurring or has occurred via either a merchant or the promotion and marketing service. Transaction data may also include information relating to the transaction. For example, transaction data may include consumer payment or billing information, consumer shipping information, items purchased by the consumer, a merchant rewards account number associated with the consumer, the type of shipping selected by the consumer for fulfillment of the transaction, or the like.

As used herein, the term "location data" refers to electronic information indicating a particular location. Location data may be associated with a consumer, a merchant, or any other entity capable of interaction with the promotion and marketing service. For example, in some embodiments location data is provided by a location services module of a consumer mobile device. In some embodiments, location data may be provided by a merchant indicating the location of consumers within their retail location. In some embodiments, location data may be provided by merchants to indicate the current location of the merchant (e.g., a food truck or delivery service). It should be appreciated that location data may be provided by various systems capable of determining location information, including, but not limited to, global positioning service receivers, indoor navigation systems, cellular tower triangulation techniques, video surveillance systems, or radio frequency identification (RFID) location systems. Throughout this specification, the terms "user device" and "consumer device" may be used interchangeably.

As used herein, the term "communication channel data" refers to electronic information relating to the particular device or communication channel upon which a merchant or consumer communicates with the promotion and marketing service. In this regard, communication channel data may include the type of device used by the consumer or merchant (e.g., smart phone, desktop computer, laptop, netbook, tablet computer), the Internet Protocol (IP) address of the device, the available bandwidth of a connection, login credentials used to access the channel (e.g., a user account and/or password for accessing the promotion and marketing service), or any other data pertaining to the communication channel between the promotion and marketing service and an entity external to the promotion and marketing service.

As used herein, the term "discretionary data" refers to electronic information provided by a merchant or consumer explicitly to the promotion and marketing service in support of improved interaction with the promotion and marketing service. Upon registering with the promotion and marketing service or at any time thereafter, the consumer or merchant may be invited to provide information that aids the promotion and marketing service in providing services that are targeted to the particular needs of the consumer or merchant. For example, a consumer may indicate interests, hobbies, their age, gender, or location when creating a new account. A merchant may indicate the type of goods or services provided, their retail storefront location, contact information, hours of operation, or the like.

It should be appreciated that the term "discretionary data" is intended to refer to information voluntarily and explicitly provided to the promotion and marketing service, such as by completing a form or survey on a website or application hosted by the promotion and marketing service. However, it should be appreciated that the examples of discretionary data provided above may also be determined implicitly or through review or analysis of other electronic marketing information provided to the promotion and marketing service. It should also be appreciated that the promotion and marketing service may also grant access to certain features or tools based on whether certain discretionary data has been provided. For example, the consumer may be required to provide information relating to their interests or location during a registration process. In some implementations, the "discretionary data" may include demographic data.

As used herein, the term "offering parameters" refers to terms and conditions under which the promotion is offered by a promotion and marketing service to consumers. These offering parameters may include parameters, bounds, considerations and/or the like that outline or otherwise define the terms, timing, constraints, limitations, rules or the like under which the promotion is sold, offered, marketed, or otherwise provided to consumers. Example offering parameters include, using the aforementioned restaurant as the example provider, limited to one instrument per person, total of 100 instruments to be issued, a run duration of when the promotion will be marketed via the promotion and marketing service, and parameters for identifying consumers to be offered the promotion (e.g., factors influencing how consumer locations are used to offer a promotion).

As used herein, the term "redemption parameters" refers to terms and conditions for redeeming or otherwise obtaining the benefit of promotions obtained from a promotion and marketing service. The redemption parameters may include parameters, bounds, considerations and/or the like that outline the term, timing, constraints, limitations, rules or the like for how and/or when an instrument may be redeemed. For example, the redemption parameters may include an indication that the instrument must be redeemed prior to a specified deadline, for a specific good, service or experience and/or the like. For example, using the aforementioned restaurant as the example provider, the redemption parameters may specify a limit of one instrument per visit, that the promotion must be used in-store only, or that the promotion must be used by a certain date.

As used herein, the term "promotion content" refers to display factors or features that influence how the promotion is displayed to consumers. For example, promotion content may include an image associated with the promotion, a narrative description of the promotion or the merchant, a display template for association with the promotion, or the like. For example, merchant self-service indicators (defined below) may be used to identify promotion offers that were generated by merchants with similar characteristics to the merchant self-service indicators. Various other factors may be used to generate the promotion offer, such as the success of the promotion offers generated by the merchants with similar characteristics, the product availability of the merchant, and the like.

As used herein, the term "promotion component" is used to refer to elements of a particular promotion that may be selected during a promotion generation process. Promotion components may include any aspect of a promotion, including, but not necessarily limited to, offering parameters, redemption parameters, and promotion content. For example, promotion components may include, but are not limited to, promotion titles, promotion ledes (e.g., a short text phrase displayed under a promotion title), promotion images, promotion prices, promotion discount levels, promotion style sheets, promotion fonts, promotion e-mail subjects, promotion quantities, promotion fine print options, promotion fees assessed to the merchant by the promotion and marketing service, or the like. Promotion components may also include various flags and settings associated with registration and verification functions for a merchant offering the promotion, such as whether the identity of the merchant has been verified, whether the merchant is registered with the promotion and marketing service, or the like.

As used herein, the term "electronic marketing communication" refers to any electronically generated information content provided by the promotion and marketing service to a consumer for the purpose of marketing a promotion, good, or service to the consumer. Electronic marketing communications may include any email, short message service (SMS) message, web page, application interface, or the like, electronically generated for the purpose of attempting to sell or raise awareness of a product, service, promotion, or merchant to the consumer.

It should be appreciated that the term "electronic marketing communication" implies and requires some portion of the content of the communication to be generated via an electronic process. For example, a telephone call made from an employee of the promotion and marketing service to a consumer for the purpose of selling a product or service would not qualify as an electronic marketing communication, even if the identity of the call recipient was selected by an electronic process and the call was dialed electronically, as the content of the telephone call is not generated in an electronic manner. However, a so-called "robo-call" with content programmatically selected, generated, or recorded via an electronic process and initiated by an electronic system to notify a consumer of a particular product, service, or promotion would qualify as an electronic marketing communication. Similarly, a manually drafted e-mail sent from an employee of the promotion and marketing service to a consumer for the purpose of marketing a product would not qualify as an electronic marketing communication. However, a programmatically generated email including marketing materials programmatically selected based on electronic marketing information associated with the recipient would qualify as an electronic marketing communication.

As used herein, the term "business analytic data" refers to data generated by the promotion and marketing service based on electronic marketing information to assist with the operation of the promotion and marketing service and/or one or more merchants. The various streams of electronic marketing information provided to and by the promotion and marketing service allow for the use of sophisticated data analysis techniques that may be employed to identify correlations, relationships, and other associations among elements of electronic marketing information. These associations may be processed and formatted by the promotion and marketing service to provide reports, recommendations, and services both internal to the promotion and marketing service and to merchants in order to improve the process by which merchants and promotion and marketing service engage with consumers. For example, the promotion and marketing service may analyze the electronic marketing information to identify an increased demand for a particular product or service, and provide an electronic report to a merchant suggesting the merchant offer the particular product or service. Alternatively, the promotion and marketing service may identify that a particular product or service is not selling well or that sales of the product or service result in the merchant losing money, customers, or market share (e.g., after consumers order a particular menu item, they never come back to the merchant), and suggest that the merchant should discontinue offering that product or service.

It should be appreciated that the term "business analytic data" is intended to refer to electronically and programmatically generated data. For example, a printed report or letter manually drafted by an employee of the promotion and marketing service would not be said to include business analytic data, even if said data was used by the employee during the drafting process, while a data disk or downloaded file containing analytics generated by the promotion and marketing service would be considered business analytic data.

As used herein, the terms "merchant self-service indicator" and "promotion context" relate to data associated with the merchant that may be used to classify the merchant or suggest promotion components to the merchant. A promotion context may include a plurality of merchant self-service indicators. For example, a promotion context may include multiple merchant self-service indicators that describe various features or characteristics of the merchant, such as a the type of industry of the merchant, the type of products or services sold by the merchant, the size of the merchant, the location of the merchant, the sales volume of the merchant, reviews and ratings for the merchant, or the like.

In some embodiments, the merchant self-service indicators are a result of analytics that allow for generation of promotions that are ideal for the particular merchant's circumstances. For example, the merchant self-service indicators may be used to identify optimal promotions for the particular merchant based on their exact location (e.g., the particular city street of the merchant as opposed to a wider range, such as a zip code), the merchant's exact products and services offered (e.g., pizzerias that only serve deep dish pizza, restaurants that become nightclubs after 11:00 pm), the merchant's price point (e.g., barbershops that charge more than $20 for a haircut), or the date or season of the year (e.g., offering ski equipment during the winter, or holiday themed promotions during the holiday season), or the like. These merchant self-service indicators may be used in a self-service process to identify promotion components that were used by other merchants that share one or more same or similar merchant self-service indicators. For example, after initial registration and verification, the promotion and marketing service may identify the merchant self-service indicators associated with the newly registered merchant, such as by looking up the merchant in a merchant database or by receiving the merchant self-service indicators directly from the merchant (e.g., by a fillable form). The merchant self-service indicators and promotion contexts may be used for classification of merchants. For example, such attributes may be used to identify whether a promotion for a specific merchant is likely to satisfy consumers (e.g., the promotion has 70% chance to satisfy consumers. Further, predictions of consumer behavior may be used in combination with the merchant attributes above to identify whether a promotion for a specific merchant is likely to satisfy a particular consumer belonging to a particular cohort. For example, a promotion may have an 85% chance to satisfy a first consumer, while having a 20% chance to satisfy a second consumer. Accordingly, the optimal promotions for the particular merchant may be provided to consumers that are likely to be satisfied with the optimal promotion. For example, the promotion may be provided to the first consumer and not provided to the second consumer.

It should be appreciated that the term "programmatically expected" indicates machine prediction of occurrence of certain events. For example, a "programmatically expected" number of purchases by a first consumer is a number determined by machine prediction specifying the expected number of promotions that will be purchased by the first consumer.

As used herein, the term "likelihood" refers to a measure of probability for occurrence of a particular event. For example, the likelihood that a consumer will purchase a promotion within a pre-specified period may be a value associated with a specific scale. In some implementations, the machine predictions discussed above are based, at least in part, on the "likelihood" that an event will occur. Similarly, in some implementations, machine predictions are based on attributes associated with a consumer and/or an associated merchant promotion.

It should be appreciated that the terms "subset" describes a proper subset. A proper subset of set is portion of the set that is not equal to the set. For example, if elements A, B, and C belong to a first set, a subset including elements A and B is a proper subset of the first set. However, a subset including elements A, B, and C is not a proper subset of the first set.

As used herein the term "cohort" refers to group or sub group that has one or more common features. For example, consumers that have only made a single purchase in a previous year may belong to a particular cohort. Similarly, consumers that made 10 purchases in the same year may belong to different cohort.

Technical Underpinnings and Implementation of
Exemplary Embodiments

Merchants, including manufacturers, wholesalers, and retailers, have spent a tremendous amount of time, money, manpower, and other resources to determine the best way to market their products to consumers. Whether a given marketing effort is successful is often determined based on the return-on-investment offered to the merchant from increased awareness, sales, and the like, of the merchant's goods and services in exchange for the resources spent on the marketing effort. In other words, optimal marketing techniques generally maximize the benefit to the merchant's bottom line while minimizing the cost spent on marketing. To this end, a merchant's marketing budget may be spent in a variety of different manners including advertising, offering of discounts, conducting market research, and various other known marketing techniques. The end goal of these activities is to ensure that products are presented to consumers in a manner that maximizes the likelihood that the consumers will purchase the product from the merchant that performed the marketing activities while minimizing the expense of the marketing effort.

The advent of electronic commerce has revolutionized the marketing process. While merchants would typically have to perform costly market research such as focus groups, surveys, and the like to obtain detailed information on consumer preferences and demographics, the digital age has provided a wealth of new consumer information that may be used to optimize the marketing and sales process. As a result, new technologies have been developed to gather, aggregate, analyze, and report information from a variety of electronic sources.

So-called "clickstream data" provides a robust set of information describing the various interactions consumers have with electronic marketing information provided to them by merchants and others. Promotion and marketing services have been developed with sophisticated technology to receive and process this data for the benefit of both merchants and consumers. These services assist merchants with marketing their products to interested consumers, while reducing the chance that a consumer will be presented with marketing information in which the consumer has no interest. Some promotion and marketing services further leverage their access to the trove of electronic marketing information to assist merchants and consumers with other tasks, such as offering improved merchant point-of-sale systems, improved inventory and supply chain management, improved methods for delivering products and services, and the like.

Unlike conventional marketing techniques related to the use of paper or other physical media (e.g., coupons clipped from a weekly newspaper), promotion and marketing services offer a wealth of additional electronic solutions to improve the experience for consumers and merchants. The ability to closely monitor user impressions provides the ability for the promotion and marketing service to gather data related to the time, place, and manner in which the consumer engaged with the impression (e.g., viewed, clicked, moused-over) and obtained and redeemed the promotion. The promotion and marketing service may use this information to determine which products and services are most relevant to the consumer's interest, and to provide marketing materials related to said products and services to the consumer, thus improving the quality of the electronic marketing communications received by the consumer. Merchants may be provided with the ability to dynamically monitor and adjust the parameters of promotions offered by the promotion and marketing service, ensuring that the merchant receives a positive return on their investment. For example, the merchant can closely monitor the type, discount level, and quantity sold of a particular promotion on the fly, while with traditional printed coupons the merchant would not be able to make any changes to the promotion after the coupon has gone to print. Each of these advancements in digital market and promotion distribution involve problems unique to the digital environment not before seen in traditional print or television broadcast marketing.

However, these promotion and marketing services are not without problems. Although the clickstream data provides a wealth of information, the inventors have determined that existing techniques may not always leverage this information in an efficient or accurate manner. Technology continues to rapidly advance in the field of analytics and the processing of this information, offering improved data gathering and analysis techniques, resulting in more relevant and accurate results provided in a more efficient manner. Electronic marketing services continue to evolve and provide improved methods for engaging consumers and spreading awareness of products offered by promotion and marketing services.

In many cases, the inventors have determined that these services are constrained by technological obstacles unique to the electronic nature of the services provided, such as constraints on data storage, accuracy of data available, machine communication and processor resources. The inventors have identified that the wealth of electronic data available to these services and the robust nature of electronic marketing communications techniques present new challenges never contemplated in the world of paper coupons and physical marketing techniques. The inventors have further determined that even technological methods that leverage computers for statistical analysis and consumer behavior modeling (e.g., television rating systems) fail to address problems associated with providing relevant, high quality electronic marketing communications (e.g., impressions) to consumers in a manner that maximizes accuracy, minimizes error, is user friendly and provides for efficient allocation of resources. Embodiments of the present invention as described herein serve to correct these errors and offer improved resource utilization, thus providing improvements to electronic marketing services that address problems arising out of the electronic nature of those services. For example, providing promotions and advertisements to consumers based on predictions of consumer behavior and at a rate based on the prediction, ensures that the consumers are responsive to the promotions and enhances the consumer experience. Similarly, advertisement and marketing efforts may target consumers that are likely to be satisfied with and be responsive to advertisements and marketing efforts. In turn, this reduces resources required to manage and provide promotions. Similarly, this reduces the cost associated with providing promotions, advertisements and cost associated with marketing campaigns. By eliminating the processing required for providing promotions, advertisements, and conducting advertisement campaigns that are unlikely to be successful, the stress on processor 202 is substantially reduced. For example, since the numbers of operations performed by processor 202 are significantly reduced, the power consumption, and the processing power and speed requirements for processer 202 are also reduced. In turn the maintained and operational costs of circuitry 200 are also reduced.

The inventors have identified that being able to more accurately predict consumer behavior, can greatly enhance the performance of promotional and marketing services. Accordingly being able to accurately predict consumers' behavior can be very useful in selecting promotions to offer each respective consumer. Similarly, accurate predictions of consumer behavior can be used to determine how to most effectively provide advertisements to consumers. For example, the predictions may be used to determine the most effective medium of advertising for a particular consumer, the most effective frequency of providing advertisements to consumers, and/or other optimizations for marketing campaigns. The predictions may be used to determine financial projections associated with the promotional and marketing service. Similarly, the predictions may be used to optimize financial aspects associated with the promotional and marketing service. For example, the predictions can aid in determining the most effective size of inventory, the most effective number of employees at different departments, and/or the like.

Being able to selectively offer a promotion and advertisements to consumers, based on accurate consumer behavior predictions, allows for offering of higher quality promotions that are likely to satisfy consumers and result in conversions. This, in turn, is reflected on the resources required to operate and maintain the promotional service. For example, providing promotions that are likely to satisfy consumers, increases the processing efficiency of exemplary circuitry 200 and reduces the stress on exemplary circuitry 200. In some implementations, this can result in faster processing and response times, which in turn improve the consumer experience. Additionally, the consumer experience is also enhanced because the consumer is less likely to receive promotions that are not relevant to their interests.

The inventors have also identified multiple obstacles associated with accurately predicting consumer behavior. Generally, a machine learned model is trained with a random sample of data. However, the inventors realized that predictions particular segments of consumers are likely to be accurate when based on similar attributes. Additionally, training prediction models based on a large random sample of data may cause a high level of stress on the performing system. Accordingly, the inventors realized that training cohorts of consumers that share a certain measure of similarity independently will yield more accurate results and reduce the stress on the performing system. Similarly, the inventors realized that most effective attributes for determining whether a consumer will make a purchase are different than attributes that are most effective in determining the number of purchases that a consumer is likely to purchase. Therefore, the inventors determined that a 2 stage prediction system that is trained based on different attributes for different cohorts would not only increase the accuracy of predictions, but also reduce the required processing power of the performing system. In turn, this reduces the power consumption, maintenance costs and heat generation by the performing system.

The inventors have therefore determined that existing electronic systems for predicting consumer behavior fail to accurately and efficiently address these issues. As a result of these problems and others that may arise from time to time, delays and inefficiencies may be introduced into the prediction process, which in turn may be reflected on user satisfaction and overall revenue generated. The inventors identified a set of attributes that when incorporated in a machine prediction system can accurately and efficiently predict whether a consumer will make a purchase (e.g., accept a promotion) within a pre-specified window, and the number of purchases that are likely to be made by the consumer. In some implementations, the attributes are different for different cohorts and/or groups of consumers. As a result, the predictions and above may be utilized to significantly improve the user experience, allow for optimization of various performance aspects associated with the promotional and advertisement service, and increase the overall revenue associated with offering promotions.

System Architecture and Example Apparatus

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile terminals, such as a portable digital assistant (PDA), mobile telephone, smartphone, laptop computer, tablet computer, or any combination of the aforementioned devices.

In this regard, FIG. 1 discloses an example computing system within which embodiments of the present invention may operate. Merchants may access a promotion and marketing service 102 via a network 112 (e.g., the Internet, or the like) using computer devices 108A through 108N and 110A through 110N, respectively (e.g., one or more consumer devices 108A-108N or one or more merchant devices 110A-110N). Moreover, the promotion and marketing service 102 may comprise a server 104 in communication with a database 106.

The server 104 may be embodied as a computer or computers as known in the art. The server 104 may provide for receiving of electronic data from various sources, including but not necessarily limited to the consumer devices 108A-108N and the merchant devices 110A-110N. For example, the server 104 may be operable to receive and process clickstream data provided by the consumer devices 108 and/or the merchant devices 110. The server 104 may also facilitate e-commerce transactions based on transaction information provided by the consumer devices 108 and/or the merchant devices 110. The server 104 may facilitate the generation and providing of various electronic communications and marketing materials based on the received electronic data.

The database 106 may be embodied as a data storage device such as a Network Attached Storage (NAS) device or devices, or as a separate database server or servers. The database 106 includes information accessed and stored by the server 104 to facilitate the operations of the promotion and marketing service 102. For example, the database 106 may include, without limitation, user account credentials for system administrators, merchants, and consumers, data indicating the products and promotions offered by the promotion and marketing service, clickstream data, analytic results, reports, financial data, and/or the like.

The consumer devices 108A-108N may be any computing device as known in the art and operated by a consumer. Electronic data received by the server 104 from the consumer devices 108A-108N may be provided in various forms and via various methods. For example, the consumer devices 108A-108N may include desktop computers, laptop computers, smartphones, netbooks, tablet computers, wearables, and the like. The information may be provided through various sources on these consumer devices.

In embodiments where a consumer device 108 is a mobile device, such as a smart phone or tablet, the consumer device 108 may execute an "app" to interact with the promotion and marketing service 102. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 8®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of consumers. In some embodiments, a mobile operating system may also provide for improved communication interfaces for interacting with external devices (e.g., home automation systems, indoor navigation systems, and the like). Communication with hardware and software modules executing outside of the app is typically provided via application programming interfaces (APIs) provided by the mobile device operating system.

The promotion and marketing service 102 may leverage the application framework offered by the mobile operating system to allow consumers to designate which information is provided to the app and which may then be provided to the promotion and marketing service 102. In some embodiments, consumers may "opt in" to provide particular data to the promotion and marketing service 102 in exchange for a benefit, such as improved relevancy of marketing communications offered to the user. In some embodiments, the consumer may be provided with privacy information and other terms and conditions related to the information provided to the promotion and marketing service 102 during installation or use of the app. Once the consumer provides access to a particular feature of the mobile device, information derived from that feature may be provided to the promotion and marketing service 102 to improve the quality of the consumer's interactions with the promotion and marketing service.

For example, the consumer may indicate that they wish to provide location information to the app from location services circuitry included in their mobile device. Providing this information to the promotion and marketing service 102 may enable the promotion and marketing service 102 to offer promotions to the consumer that are relevant to the particular location of the consumer (e.g., by providing promotions for merchants proximate to the consumer's current location). It should be appreciated that the various mobile device operating systems may provide the ability to regulate the information provided to the app associated with the promotion and marketing service 102. For example, the consumer may decide at a later point to disable the ability of the app to access the location services circuitry, thus limiting the access of the consumer's location information to the promotion and marketing service 102.

Various other types of information may also be provided in conjunction with an app executing on the consumer's mobile device. For example, if the mobile device includes a social networking feature, the consumer may enable the app to provide updates to the consumer's social network to notify friends of a particularly interesting promotion. It should be appreciated that the use of mobile technology and associated app frameworks may provide for particularly unique and beneficial uses of the promotion and marketing service through leveraging the functionality offered by the various mobile operating systems.

Additionally or alternatively, the consumer device 108 may interact through the promotion and marketing service 102 via a web browser. As yet another example, the consumer device 108 may include various hardware or firmware designed to interface with the promotion and marketing service 102 (e.g., where the consumer device 108 is a purpose-built device offered for the primary purpose of communicating with the promotion and marketing service 102, such as a store kiosk).

The merchant devices 110A-110N may be any computing device as known in the art and operated by a merchant. For example, the merchant devices 110A-110N may include a merchant point-of-sale, a merchant e-commerce server, a merchant inventory system, or a computing device accessing a web site designed to provide merchant access (e.g., by accessing a web page via a browser using a set of merchant account credentials). Electronic data received by the promotion and marketing service 102 from the merchant devices 110A-110N may also be provided in various forms and via various methods. For example, the merchant devices 110A-110N may provide real-time transaction and/or inventory information as purchases are made from the merchant. In other embodiments, the merchant devices 110A-110N may be employed to provide information to the promotion and marketing service 102 to enable the promotion and marketing service 102 to generate promotions or other marketing information to be provided to consumers.

An example of a data flow for exchanging electronic information among one or more consumer devices, merchant devices, and the promotion and marketing service is described below with respect to FIG. 3.

Example Apparatus for Implementing Embodiments of the Present Invention

The server 104 may be embodied by one or more computing systems, such as apparatus 200 shown in FIG. 2. As illustrated in FIG. 2, the apparatus 200 may include a processor 202, a memory 204, input/output circuitry 206, communications circuitry 208, cohort management circuitry 210, binary promotion prediction circuitry 212, and number of promotions prediction circuitry 214. The apparatus 200 may be configured to execute the operations described above with respect to FIG. 1 and below with respect to FIGS. 3-7, and 9-10. Although these components 202-214 are described with respect to functional limitations, it should be understood that the particular implementations necessarily include the use of particular hardware. It should also be understood that certain of these components 202-214 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

Cohort management circuitry 210 includes hardware configured to identify and manage consumer cohorts. The cohort management circuitry 210 may utilize processing circuitry, such as the processor 202, to perform these actions. The cohort management circuitry 210 may send and/or receive data from binary promotion prediction circuitry 212 and/or number of promotion prediction circuitry 214. In some implementations, the sent and/or received data may be data identifying a plurality of cohorts and data identifying how the cohorts are defined. In some implementations, the data may include a normalized score for each identified score, the cutoff score indicating a cutoff score below which consumers belonging to a particular cohort are identified as unlikely to make a purchase during a pre-specified period. For example, a normalized score may be determined for consumers belonging to first cohort by binary prediction circuitry 212. Consumers having a normalized score above the received cutoff score may be identified as consumers that are likely to make, at least, one purchase during the pre-specified period. It should also be appreciated that, in some embodiments, the cohort management circuitry 210 may include a separate processor, specially configured field programmable gate array (FPGA), or application specific interface circuit (ASIC) to classify, update classifications and/or manage classifications of consumers, and train and use a machine learning model for predicting consumer behavior. In some implementations, binary promotion prediction circuitry 212 and number of promotion prediction circuitry 214, described below, may be sub-circuitry belonging to cohort management circuitry 210. The cohort management circuitry 210 may be implemented using hardware components of the apparatus configured by either hardware or software for implementing these planned functions.

Binary promotion prediction circuitry 212 includes hardware configured to identify and determine a prediction specifying consumer behavior during a pre-specified period. In some implementations, the prediction is specified as a probability or likelihood that a consumer will make a purchase during a pre-specified period. In some implementations, the prediction is specified as an indication of whether a consumer will make a purchase during a pre-specified period. The binary promotion prediction circuitry 212 may utilize processing circuitry, such as the processor 202, to perform these actions. However, it should also be appreciated that, in some embodiments, the binary promotion prediction circuitry 212 may include a separate processor, specially configured field programmable gate array (FPGA), or application specific interface circuit (ASIC) for determining a prediction specifying a likelihood that a promotion will be terminated. Similarly, number of promotions prediction circuitry 214 includes hardware configured to identify and determine a prediction of a number of promotions a consumer will accept during a pre-specified period. Such prediction may also be specified as a probability or a likelihood. Again, it should also be appreciated that, in some embodiments, the number of promotions prediction circuitry 214 may include a separate processor, specially configured field programmable gate array (FPGA), or application specific interface circuit (ASIC) for determining a number of promotions that are likely to be accepted by a consumer during a pre-specified period. Circuitry 212 and 214 may be implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor or other programmable circuitry that execute the code on the machine create the means for implementing various functions, including those described herein.

It is also noted that all or some of the information presented by the example displays discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Electronic Marketing Information Service Data Flow

FIG. 3 depicts an example data flow 300 illustrating interactions between a server 302, one or more consumer devices 304, and one or more merchant devices 306. The server 302 may be implemented in the same or a similar fashion as the server 104 as described above with respect to FIG. 1, the one or more consumer devices 304 may be implemented in the same or a similar fashion as the consumer devices 108A-108N as described above with respect to FIG. 1, and the one or more merchant devices 306 may be implemented in the same or a similar fashion as the merchant devices 110A-110N as described above with respect to FIG. 1.

The data flow 300 illustrates how electronic information may be passed among various systems when employing a server 302 in accordance with embodiments of the present invention. The one or more consumer devices 304 and/or one or more merchant devices 306 may provide a variety of electronic marketing information to the server 302 for use in providing promotion and marketing services to the consumer. This electronic marketing information may include, but is not limited to, location data, clickstream data, transaction data, communication channel data, historical data, review data and/or discretionary data.

As a result of transactions performed between the one or more consumer devices 304 and the server 302, the server 302 may provide fulfillment data to the consumer devices. The fulfillment data may include information indicating whether the transaction was successful, the location and time the product will be provided to the consumer, instruments for redeeming promotions purchased by the consumer, or the like.

In addition to the e-commerce interactions with the one or more consumer devices 304 offered by the server 302, the server 302 may leverage information provided by the consumer devices to improve the relevancy of marketing communications to individual consumers or groups of consumers. In this manner, the server 302 may determine promotions, goods, and services that are more likely to be of interest to a particular consumer or group of consumers based on clickstream data, location data, and other information provided by and/or relating to particular consumers. For example, the server 302 may detect the location of a consumer based on location data provided by the consumer device, and offer promotions based on the proximity of the consumer to the merchant associated with those promotions.

Alternatively, the server 302 may note that the consumer has an interest in a particular hobby (e.g., skiing) based on electronic marketing information associated with the consumer (e.g., a browser cookie that indicates they frequently visit websites that provide snowfall forecasts for particular ski resorts), and offer promotions associated with that hobby (e.g., a promotion offering discounted ski equipment rentals or lift tickets). It should be appreciated that a variety of different types of electronic marketing information could be provided to the server 302 for the purpose of improving the relevancy of marketing communications. It should also be appreciated that this electronic marketing information may be received from a variety of electronic sources, including various consumer devices, merchant devices, and other sources both internal and external to a promotion and marketing service. For example, other data sources may include imported contact databases maintained by merchants, electronic survey questions answered by consumers, and/or various other forms of electronic data.

It should also be appreciated that the server 302 may also control other factors of the electronic marketing communications sent to the consumer other than the particular promotions included in the electronic marketing communication. For example, the server 302 may determine the form, structure, frequency, and type of the electronic marketing communication. As with the content of the electronic marketing communication, these factors may be programmatically determined according to various methods, factors, and processes based on electronic data received by the server 302 for the purpose of maximizing the likelihood that the communication will be relevant to the recipient consumer.

The server 302 interactions with the one or more merchant devices 306 may be related to enabling the merchant to market their products using a promotion and marketing service. For example, the one or more merchant devices 306 may provide promotion data defining one or more promotions to be offered by the promotion and marketing service on behalf of the merchant. The server 302 may receive this information and generate information for providing such promotions via an e-commerce interface, making the promotions available for purchase by consumers. The server 302 may also receive information about products from the one or more merchant devices 306. For example, a merchant may provide electronic marketing information indicating particular products, product prices, inventory levels, and the like to be marketed via a promotion and marketing service. The server 302 may receive this information and generate listing information to offer the indicating products to consumers via a promotion and marketing service.

The one or more merchant devices 306 may also receive information from the server 302. For example, in some embodiments a merchant may obtain access to certain business analytic data aggregated, generated, or maintained by the server 302. As a particular example, a merchant might offer to pay for consumer demographic data related to products or services offered by the merchant. It should be appreciated, however, that a merchant may not need to list any products or services via the promotion and marketing service in order to obtain such data. For example, the promotion and marketing service may enable merchants to access electronic marketing data offered via the promotion and marketing service based on a subscription model. The one or more merchant devices 306 may also receive electronic compensation data from the server 302. For example, when a promotion or product is sold by the promotion and marketing service on behalf of the merchant, a portion of the received funds may be transmitted to the merchant. The compensation data may include information sufficient to notify the merchant that such funds are being or have been transmitted. In some embodiments, the compensation data may take the form of an electronic wire transfer directly to a merchant account. In some other embodiments, the compensation data may indicate that a promotion or product has been purchased, but the actual transfer of funds may occur at a later time. For example, in some embodiments, compensation data indicating the sale of a promotion may be provided immediately, but funds may not be transferred to the merchant until the promotion is redeemed by the consumer.

Embodiments advantageously provide for improvements to the server by allowing prediction of consumer behavior more efficiently and accurately. In turn, this reduces the server stress. For example, by eliminating provisioning of promotions that are unlikely to be accepted by consumers, the server reduces the processing associated with offering promotions without reducing the overall number of promotions accepted by consumers. In turn, the processing power requirement of the server is reduced and the overall revenue is increased.

Example Processes for Predicting Consumer Behavior

As described, a promotional and marketing service may utilize the internet to provide consumers with available promotions related to products, services or experiences offered by providers that may be of interest to the consumers. However, determining which consumer to provide promotions or advertisements to may prove challenging. A promotion and marketing service may spend limited resources finding, engaging, and advertising to consumers. However, some consumers are less likely to make a purchase or accept a promotion in response to the efforts above. Other consumers may be very responsive to such efforts.

Naturally, the ability to accurately predict consumer behavior can significantly improve revenue and user satisfaction. As described, both consumers and promotional and marketing services can benefit greatly from such accurate predictions. Additionally, predicting consumer behavior can enable the promotional and marketing service to optimize and adjust various financial, business, and marketing aspects based on the predictions. Accordingly, there exists a dire market need for methods and systems that can accurately predict consumer behavior accordingly.

Figure 4:
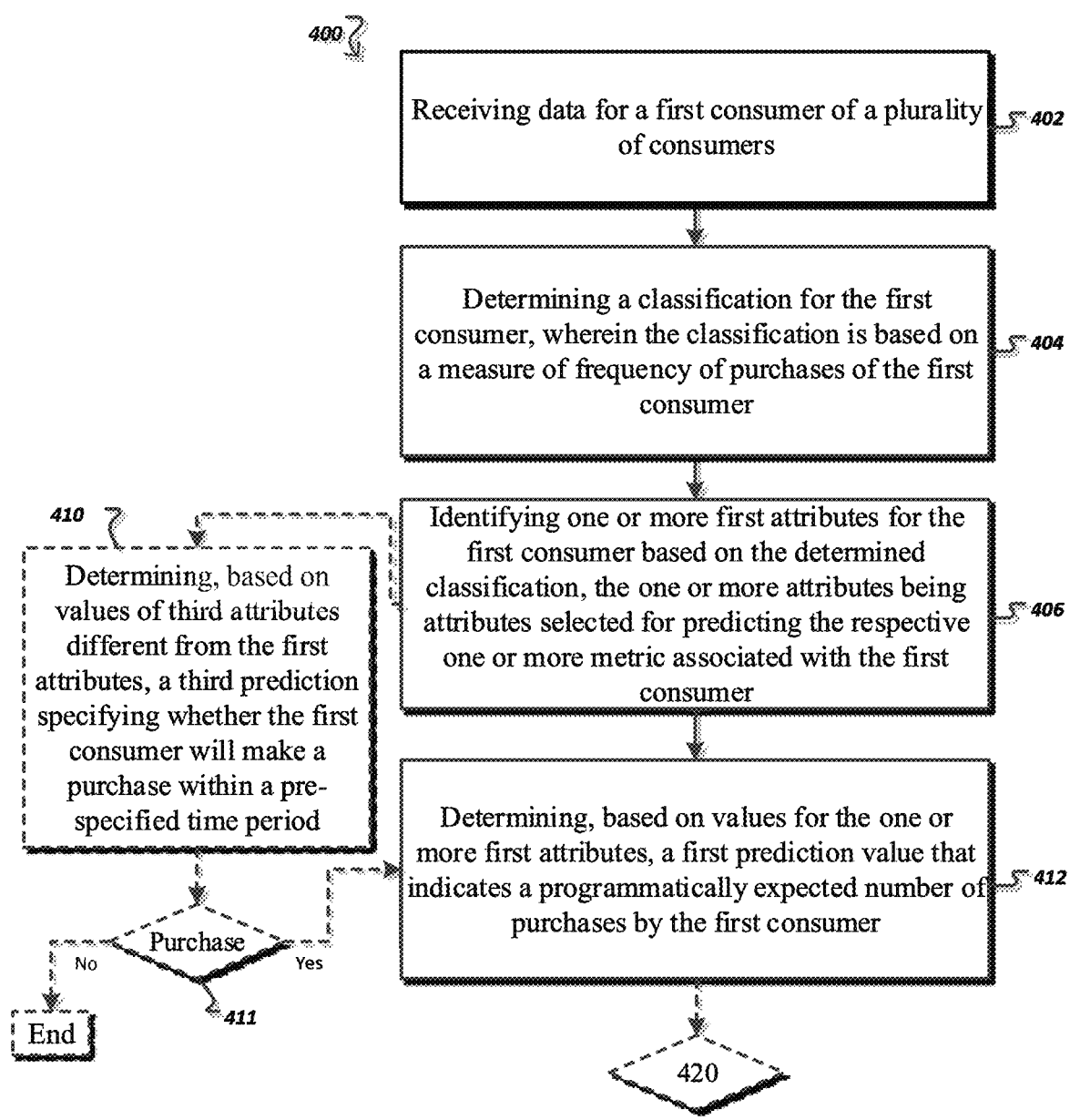

FIG. 4 is a flow chart of an example process 400 for predicting consumer behavior. The process 400 begins with receiving data for a first consumer of a plurality of consumers (402). In some implementations, the consumer may be a consumer or a potential consumer of a promotional and marketing service. The promotional and marketing service may be a service for electronically providing promotions for a second entity (e.g., third party). For example, the second entity may be a department store that is requesting transmittal of a promotion for goods (e.g., clothing, shoes, toys, food items, camping equipment) offered by the department store. In some implementations, the promotion may be for any of the goods offered by the department store. In some implementations, the promotion may be for a specific type of goods offered by the department store (e.g., camping equipment). In some implementations, the promotion may be for a specific item, such as, a bike. Similarly, the second entity may be a service store, such as a hair salon or a car repair shop. In such implementations, the service store may request transmittal of promotion for services provided by the store (e.g., haircut, hair coloring, oil change). In some implementations, stores may offer a combination of services and goods.

In some implementations, the received data associated with the first consumer is historical data. For example, the received data may be data indicating the number of promotions previously accepted by the consumer. The data may indicate the time and a device used to accept these promotions. Similarly, the data may include a measure of frequency indicating how often promotions are accepted by the consumer. In some implementations, the data may include location data indicating, for example, locations at which the consumer accepted promotions. In some implementations, the data may include data specifying types of promotions, goods, and/or services that are of interest to the consumer. For example, the data may include discretionary data for the consumer as described above.

The process 400 continues with determining a classification for the first consumer, wherein the classification is based on a measure of frequency of purchases by the first consumer (404). For example, the measure of frequency of purchases by the first consumer may be data indicating a number of promotions accepted from the promotional and marketing service during a pre-specified period (e.g., 1 month, 3 month, 6 month, 1 year). In some implementations, the pre-specified period is a period directly before receiving the data at step 402. For example, the measure of frequency may indicate the number of promotions accepted by the first consumer during the last 3 months prior to receiving the data at step 402.

In turn, the process 400 may classify the first consumer as belonging to a cohort or a group having a purchase frequency similar to the purchase frequency of the first consumer. For example, consumers may be classified as belonging to one of 6 exemplary cohorts. In one implementation, the pre-specified period may be 1 year. A first cohort may be identified with "−1" as a cohort for consumers that never activated their respective account associated with the promotional and marketing service. A second cohort may be identified with "0" as cohort for consumers that activated their respective account but do not have sufficient data for the pre-specified period. For example, such consumers may have recently activated their respective account. Accordingly, these consumers may not have activated their account for at least a year. For example, these consumers may have activated their respective account during the previous 6 months. Accordingly, there is insufficient information for these consumers.

The third cohort "one-time buyers" may be identified with the number "1." Consumers that made a single purchase during the past year are classified as consumers belonging to the "one-time buyer" cohort. Similar, a fourth cohort for "sporadic buyers" may be identified with the number "2." Consumers that made, for example, 2 purchases during the previous year may be classified as belonging to this cohort. A fifth cohort for "loyal buyers" may be identified by the number "3." Consumers that made, for example, 3-7 purchases during the previous year may be classified as belonging to this cohort. Finally, a cohort for "power users" is identified with the number "4". For example, consumers that made 8 or more purchases during the previous year may be classified as belonging to the "power users" cohort. In some implementations, the number of cohorts may be different.

Similarly, in some implementations, the pre-specified period and the range of purchases for each cohort may be different. FIGS. 8A and 8B depict some statistical data associated with the exemplary cohorts described above.

The process 400 may continue with identifying one or more first attributes for the first consumer based on the determined classification, the one or more attributes being attributes selected for predicting the respective one or more metric associated with the first consumer (406). For example, a first set of attributes may be identified for the first consumer based on the cohort to which the first consumer belongs. For example, if the first consumer is identified as belonging to the "one time buyer" cohort, a set of attributes associated with the "one-time buyer" cohort is identified for the first consumer. Similarly, if the first consumer is identified as belonging to the "power buyer" cohort, a set of attributes associated with the "power buyer" cohort is identified for the first consumer. Exemplary attributes for the exemplary cohorts are discussed in more detail below, with reference to FIG. 11A-11D.

In some implementations, the process 400 may continue with optional step 410 shown in phantom. The process 400 may continue with determining, based on values of third attributes different from the first attributes, a third prediction specifying whether the first consumer will make a purchase within a pre-specified time period (410). For example, a set of third attributes may be identified based on the first consumer classification. The third attributes may be for predicting whether the first consumer will make a purchase or accept a promotion within the pre-specified period. In some implementation, this prediction is a binary "yes" or "no" prediction. In some implementations, the process 400 may determine a score indicating the likelihood that the first consumer is going to make a purchase during the pre-specified period. A cutoff score may be defined for each cohort, such that if a score of a consumer belonging to that cohort exceeds the cutoff score, the process 400 predicts that the consumer will make a purchase. Similarly, if the score for the first consumer is below the cutoff score, the process 400 may predict that the consumer is not going to make a purchase.

In some implementations, the score is a normalized score between the values of 0 and 1. As described, the score may represent a probability or likelihood that a consumer will make a purchase or accept a promotion. A cutoff score or percentage may be specified by the promotional and marketing service performing process 400. For example, a cutoff score of 0.7 or higher may result in a prediction indicating that the consumer will make a purchase. Naturally, a cutoff percentage or score may be customized in order to maximize accuracy of predictions. Exemplary cutoff scores and accuracy metrics for cohorts are shown in FIGS. 8A and 8B.

In some implementations, the third attributes for a consumer classified as "power user" may be different from the third attributes for a consumer classified as "one-time buyer." Similarly, the third attributes for a consumer classified as "power user" may be different from the first attributes for the same consumer. Exemplary attributes for the exemplary cohorts are discussed in more detail below, with reference to FIGS. 11A-11D.

Responsive to predicting that the fist consumer is not going to make a purchase, the process 400 may end (411). Similarly, responsive to predicting that the fist consumer is going to make a purchase, the process 400 continue to step 412. Alternatively, since steps 410 and 411 are optional, the process 400 may continue directly from step 406 to 412.

Finally, the process 400 may continue with determining, based on values for the one or more first attributes, a first prediction value that indicates a programmatically expected number of purchases by the first consumer (412). For example, the process 400 may determine based on the identified first attributes that the first consumer is likely to purchases 5 items during the next or upcoming year. In some implementations, the pre-specified period may be a year. In some implementations, the pre-specified period may be a month, 3 months, 6 months or the like.

Figure 5:
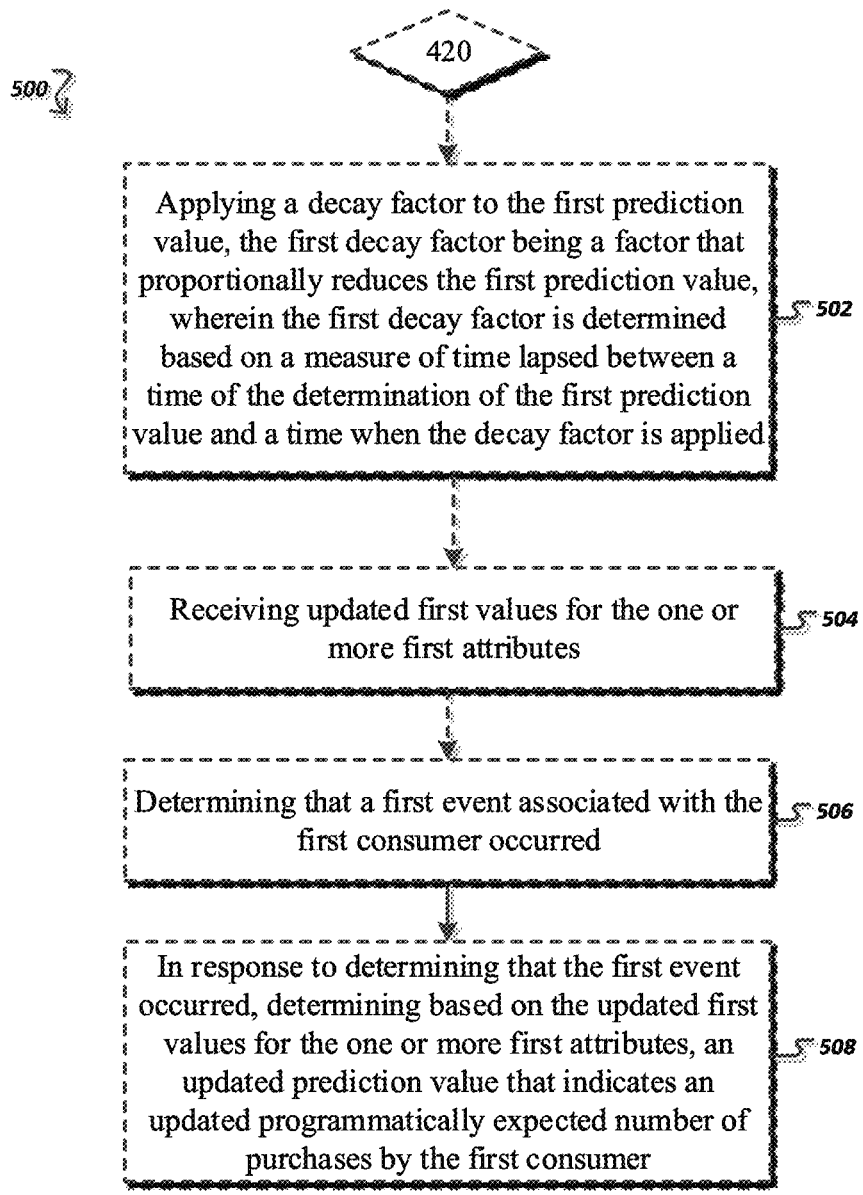

In some implementations, the process 400 may continue with optional steps of process 500, shown in phantom in FIG. 5. The process 500 may optionally apply a decay factor to the first prediction value, the first decay factor being a factor that proportionally reduces the first prediction value, wherein the first decay factor is determined based on a measure of time lapsed between a time of the determination of the first prediction value and a time when the decay factor is applied (502). For example, if 3 months elapsed after determining the first prediction, a decay factor (e.g., a value between 0 and 1) is applied to (e.g., multiplied by) the first prediction. For example, a decay factor may be applied to a first prediction indicating that that a particular "power user" is going to accept 10 promotions during the next year. The decay factor corresponding to the 3 month period may be "0.8". Accordingly, the adjusted first prediction may be 8 (0.8×10). In some implementations, the decay factor may similarly be applied to the binary score for determining whether a consumer will make a purchase during the pre-specified time.

In some implementations, the process 500 may optionally continue with receiving updated first values for the one or more first attributes (504). For example, the process 500 may receive a "n_emails_send" attribute. The "n_emails_send" may indicate the number of emails sent to a consumer, for example, during the past 3 months. Such attribute may be frequently changing, as new emails are being sent to the consumer.

In some implementations, the process 500 may optionally continue with determining that a first event associated with the first consumer occurred (506). For example, the process 500 may determine that the consumer made a new purchase or accepted a new promotion. In response to determining that the first event occurred, the process 500 may determine based on the updated first values for the one or more first attributes, an updated prediction value that indicates an updated programmatically expected number of purchases by the first consumer (508). For example, the process 500 may recalculate and update the programmatically expected number of purchases by the first consumer, in response to determine that the first consumer made a new purchase or accepted a new promotion. In some implementations, updates that require recalculation of programmatically expected numbers of purchases may only be performed in response to detecting a particular trigger event. In some implementations, the trigger event is making a new purchase or accepting a new promotion. In some implementations, the trigger event may be, for example, making a threshold number of new purchases, detecting particular changes within historical data associated with the respective consumer, reaching a particular calendar date, detecting changes within historical data of a group of consumers or a cohort, or the like. Accordingly, computer or processor intensive prediction recalculations may be performed in response to events that are likely to substantially change the prediction.

Figure 6:
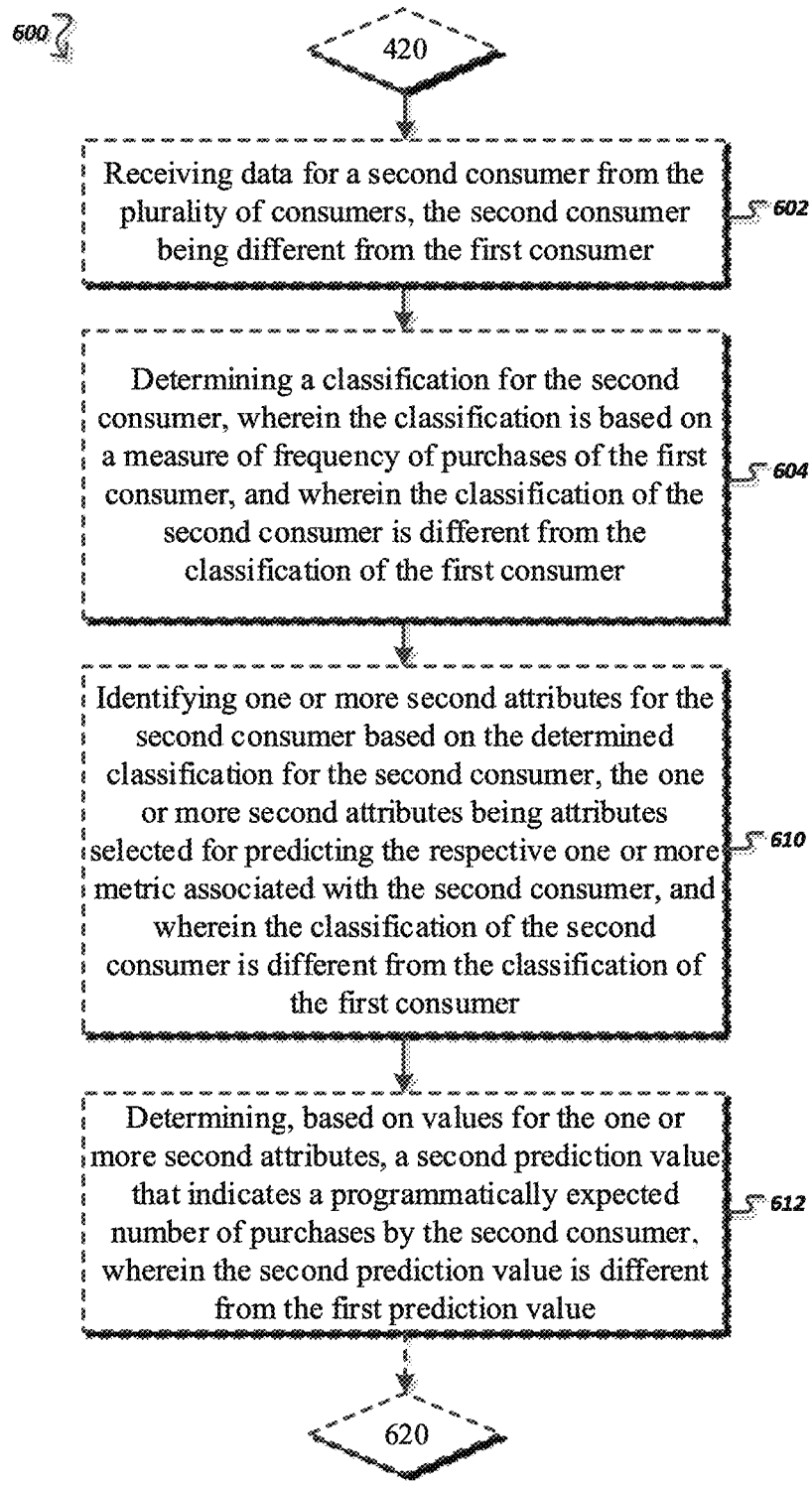

In some implementations, the process 400 or the process 500 may continue with the following optional steps of process 600, shown in phantom in FIG. 6. The process 600 may optionally receive data for a second consumer from the plurality of consumers, the second consumer being different from the first consumer. For example, the second consumer may be a consumer or a potential consumer of a promotional and marketing service different from the first consumer. In some implementations, the received data for the second consumer is historical data. For example, the received data may be data indicating the number of promotions previously accepted by the second consumer. The data may indicate the time and a device used to accept these promotions. Similarly, the data may include a measure of frequency indicating how often promotions are accepted by the consumer. In some implementations, the data may include location data indicating, for example, locations at which the consumer accepted promotions. In some implementations, the data may include data specifying types of promotions, goods, and/or services that are of interest to the consumer. For example, the data may include discretionary data for the second consumer as described above.

In some implementations, the process 600 optionally continues with determining, a classification for the second consumer, wherein the classification is based on a measure of frequency of purchases by the second consumer, and wherein the classification of the second consumer is different from the classification of the second consumer (604). For example, the measure of frequency of purchases by the second consumer may be data indicating a number of promotions accepted from the promotional and marketing service during a pre-specified period (e.g., 1 month, 3 months, 6 months, 1 year). In some implementations, the pre-specified period is a period directly before receiving the data at step 604. For example, the measure of frequency may indicate the number of promotions accepted by the second consumer during the last 3 months prior to receiving the data at step 402.

In turn, the process 400 may classify the second consumer as belonging to a cohort or a group having a purchase frequency similar to the purchase frequency of the second consumer. For example, consumers may be classified as belonging to one of the 6 exemplary cohorts described above with reference to the second consumer.

The process 600 may optionally continue with identifying, one or more second attributes for the second consumer based on the determined classification for the second consumer, the one or more second attributes being attributes selected for predicting the respective one or more metric associated with the second consumer, and wherein the classification of the second consumer is different from the classification of the first consumer (610). For example, a second set of attributes may be identified for the second consumer based on the cohort to which the second consumer belongs. For example, if the second consumer is identified as belonging to the "sporadic buyers" cohort, a set of attributes associated with the "sporadic buyers" cohort is identified for the second consumer. Similarly, if the second consumer is identified as belonging to the "loyal buyers" cohort, a set of attributes associated with the "loyal buyers" cohort is identified for the second consumer.

The process 600 may optionally continue with determining, based on values for the one or more second attributes, a second prediction value that indicates a programmatically expected number of purchases by the second consumer, wherein the second prediction value is different from the first prediction value (612). For example, the process may 600 may determine based on the identified second attributes that the second consumer is likely to purchase 2 items during the next or upcoming year. In some implementations, the pre-specified period may be a year. In some implementations, the pre-specified period may be a month, 3 months, 6 months or the like.

Figure 7:
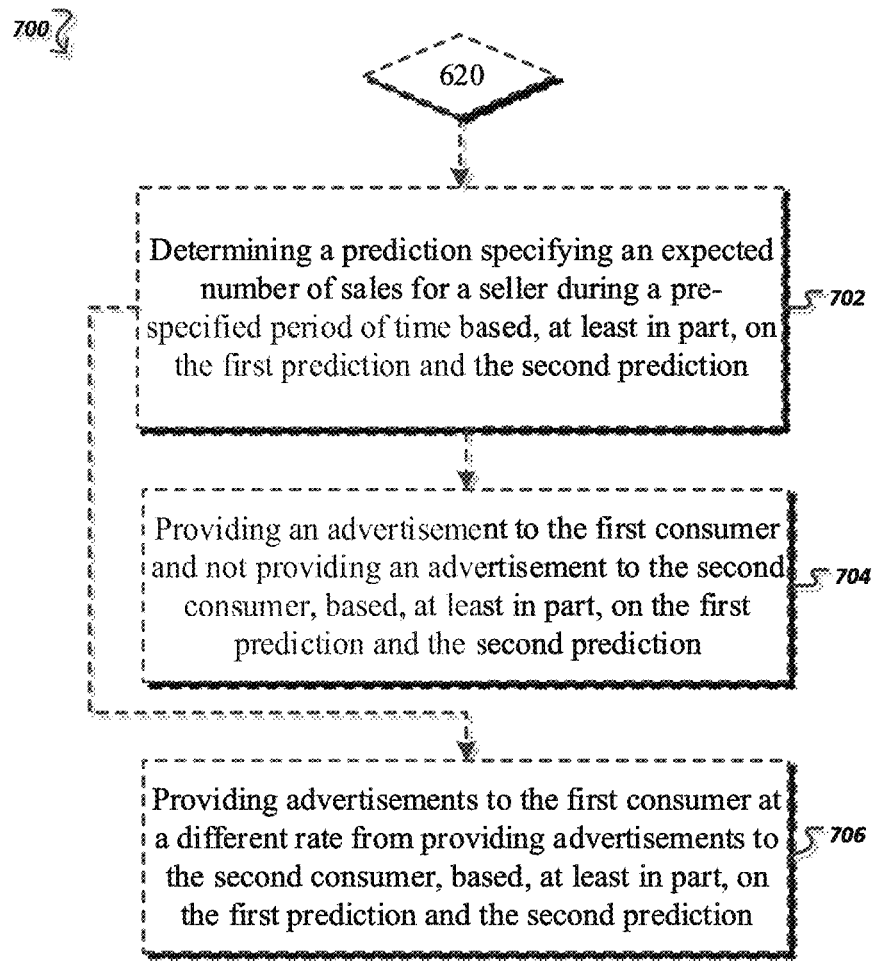

In some implementations, the processes 400, 500, or 600 may continue with the following optional steps of process 700, shown in phantom in FIG. 7. The process 700 may optionally determine a prediction specifying an expected number of sales for a seller during a pre-specified period of time based, at least in part, on the first prediction and the second prediction (702). For example, the process 700 may determine an expected number of sales by the promotional and marketing service based on a plurality of predictions for a plurality of consumers including the first and the second consumers. In some implementations, the process 700 may add or compile predictions for all consumers and potential consumers. In some implementations, the process 700 may add or compile predictions for a group or a cohort of consumers and/or potential consumers.

In some implementations, the process 700 may optionally continue with providing an advertisement to the first consumer and not providing an advertisement to the second consumer, based, at least in part, on the first prediction and the second prediction (704). For example, with the reference to the examples above, predictions specify that the first consumer is likely to purchase or accept more promotions than the second consumer. Accordingly, the first consumer may be targeted for advertisements. For example, the process 700 may provide an advertisement to the first consumer and not provide an advertisement to the second consumer. Alternatively, advertisement efforts and campaign may target consumers less likely to make a purchase, in order to increase the likelihood of these consumers making a purchase. For example, the process 700 may provide an advertisement to the second consumer and not provide an advertisement to the second consumer.

In other implementations, the process 700 may alternatively and optionally continue with providing advertisements to the first consumer at a different rate from providing advertisements to the second consumer, based, at least in part, on the first prediction and the second prediction. For example, with the reference to the examples above, predictions specify that the first consumer is likely to purchase or accept more promotions than the second consumer. Accordingly, the first consumer may be targeted for advertisements more than the second consumer. For example, the process 700 may provide advertisements to the first consumer at a higher rate than providing advertisements to the second consumer. Alternatively, advertisement efforts and campaign may target consumers less likely to make a purchase, in order to increase the likelihood of these consumers making a purchase. For example, the process 700 may provide advertisements to the second consumer at a higher rate than the first consumer.

In some implementations, predictions may be used to analyze events that may affect consumer value. For example, by analyzing interactions, by a particular consumer, with customer service, a return on investment (ROI) may be determined for the particular consumer. Further, a customer lifetime value may be a metric that can be optimized for product experimentation.

FIG. 8A depicts a graphical representation of the cutoff score against the percentage of correct binary predictions. Elements 802, 804, 806, 808 and 810 correspond to cohorts "0," "1," "2," "3," and "4" respectively. FIG. 8B shows exemplary statistical data, during a test period, for different cohorts. As can be seen in FIG. 8B the accuracy of predictions may vary for different cohorts. The variation may be based on the selected attributes for training a respective model for a respective cohort. Also, the variation may be based on a selected cutoff score for each respective cohort. Other metrics that the promotional and service data may wish to optimize are also shown. For example, the promotional and marketing service may wish to minimize a recall percentage for some cohorts. Additionally, the promotional and marketing service may wish to avoid marketing campaigns targeting cohorts having a high recall percentage. This statistical data may be used to determine optimized cutoff scores or percentages, as described above. Additionally, this statistical data may be used to determine the most important attributes as will be discussed in the following section in more detail.

Example Consumer Behavior Prediction Attributes and Selection Processes

FIGS. 11A-11D shows lists of example attributes, for predicting consumer behaviors, and an associated ranking indicating a measure of importance of each attribute for a plurality of cohorts. A list of exemplary attributes is identified for each stage of a 2 stage prediction process. Stage 1 may be for predicting whether a consumer will make a purchase during a pre-specified period. Stage 2 may be for predicting a programmatically expected number of purchases a consumer will make during the pre-specified period. In some implementations, a prediction according to stage 2 is only performed in response to a stage 1 prediction indicating that the consumer will make a purchase during the pre-specified period.

In one example, the attribute "goods_cohort" specifies a year a particular consumer accepted or purchased his/her first promotion. In some implementations, the "goods_cohort" attribute is highly ranked for particular combinations of cohorts and stages. Therefore, the "goods_cohort" is an important and effective attribute for predictions associated with the particular combination. Similarly, the attribute "days_since_order" indicating a number of days lapsed since a particular consumer made their last order, accepted their last promotion, or made their last purchase, is highly ranked for particular combinations of cohorts and stages. Accordingly the "days_since_order" attribute is an important and effective attribute for consumer behavior predictions. An attribute "gb_1yr" indicating a number of gross bookings of promotions may be highly ranked for particular combinations of cohorts and stages while being not highly ranked for other combinations. Therefore, the "gb_1yr" attribute may be used only for some combinations. Alternatively, a lower emphasis may be associated with the "gb_1yr" attribute for some combinations. For example, weights may be associated with attributes. Higher weights may be assigned to higher ranking attributes. Similarly, lower weights may be assigned to lower ranking attributes.

In some implementations, lower ranking attributes may be effective secondary attributes that complement important attributes for consumer behavior predictions. Similarly, highly ranked attributes may be effective as secondary attributes that complement important attributes for consumer behavior predictions. As described above, secondary attributes may be assigned lower weights than highly ranked attributes or primary attributes. In some implementations, the top ranking 5 attributes are identified as primary attributes. It should be understood that each of the attributes discussed in this application, may be in some embodiments, a primary or a secondary attribute. A list of exemplary attributes is provided below.

In some implementations, multiple attributes may represent historical data for a particular consumer. For example, some attributes may be associated with discretionary data for the consumer. Other attributes may be associated with the number of promotions accepted by a consumer. Some attributes may indicate a measure of frequency at which a consumer accept promotions or makes purchases. Some attributes may indicate a number of promotions accepted during a plurality of different periods. Some attributes may indicate a number or a percentage of unredeemed promotions accepted or purchased by the consumer. Some attributes may flag the consumer as belonging to a particular group or cohort. To determine a normalized value of such attributes, an algorithm may be executed on associated raw data related to a consumer. Accordingly, normalized scores, numbers, or flags can be determined for each attribute.

As can be seen in FIGS. 11A-11D, a number of example attributes relate to platform data. For example, the platform data may indicate a type of a device used to accept a promotion or make a purchase. In some implementations, the platform data may indicate a primary or a last type of a device used to accept a promotion or make a purchase. Similarly, platform data may indicate the number of different platforms (e.g., mobile, email, web) used to accept promotions or make purchases by a consumer. There is also a number of attributes related to location data. It should be understood that attribute data related to location and hyper location data may be generated in a similar fashion. For example, "n_deals" attribute may specify a number of deals available in a 5-mile radius from the location of the respective consumer during a pre-specified period. For example, "n_deals" attribute may specify a number of deals available in a 5-mile radius from the location of the respective consumer during the last quarter. Similarly, the attribute "n_hero_deals" may specify a number of hero deals available in a 5-mile radius from the consumer during the last quarter. A hero deal may be, for example, a deal that accepted by more than a threshold number of consumers. For example, a hero deal may be a deal that accepted by more than 1000 consumers. In should be understood that the radius of the location above may be adjusted to optimize various aspects of the invention. Other location attributes may specify a distance from the closest city center and a size of the closest city. For example, the closest city may be identified as one of a list of predefined sizes for cities.

In some implementations, one or more attributes may be associated with emails and email traffic from and to the promotional and marketing service. For example, the attribute "es_email" may correspond to an email engagement score (ES). In some implementations, the email engagement score is based, at least in part, on an opening rate for emails and a click or interaction rate with emails. For example, an opening rate for emails may be a ratio of emails, from the promotional and marketing service, opened by a consumer against emails sent by the promotional and marketing service to the consumer. Similarly, an interaction or click rate for emails may be a ratio of emails, from the promotional and marketing service, interacted with by the consumer against emails, from the promotional and marketing service, opened by the consumer. In some implementations, interaction with an email may be clicking a redirection link associated with the email. For example, the consumer may click a link that redirects the consumer to web page of the promotional and marketing service for purchasing a promotion associated with the email. In some implementations, the interaction may be hovering a pointing device over a link or an advertisement in the email. In some implementations, viewing an email for a period of time exceeding a pre-specified threshold may be considered an interaction.

In some implementations, a 'pct_wow' attribute specifies a percentage of promotions that are classified as "WOW" deals. In some implementations, "WOW" deals may be deals offered by merchants having a pre-specified national presence. For example, "WOW" deals may be deals offered by merchants that offer deals in at least 5 different countries. Similarly, WOW" deals may be deals offered by merchants that offer deals in at least 21 different countries. A "goods_upward_trend" attribute may indicate whether a percentage of purchases for a type of goods is increasing year over year (Y-O-Y). For example, an indication may be associated with electronic merchandise specifying that purchases by the electronic merchandise is increasing yearly.

Other exemplary attributes may include attributes corresponding to user satisfaction. In one implementation, such attributes may include an attribute specifying a number of calls made to customer service by the respective consumer during a pre-specified period. For example, the attribute may specify a number of customer service calls initiated by the consumer during the last year. Similarly, an overall wait time during customer service calls may be one attribute. In some implementations, the attributes may include attributes associated with positive and negative responses to surveys. For example, one attribute may specify a number of negative responses to surveys by the consumer. Similarly, one attribute may specify a number of positive responses to surveys by the consumer. Some attributes may be associated with data from review websites such as Yelp®, Google®, Yahoo®, City Search®, Trip Advisor®. It should be understood that any review website could have associated attribute data, such as for example Zagat®, Bing® or the like. It should also be understood that attribute data may be associated with reviews from a particular consumer. Attribute data may be generated related to positive and negative reviews provided by respective consumers.

It should also be understood that consumers may have associated data indicating one or more categories, sub-categories, location, hyper-locations, prices or the like. For example, a consumer, may be identified as a consumer that is interested in categories such as "beauty, wellness, and healthcare," "Food and drink," "Leisure Offers and Activities." Similarly, a consumer may be identified as a consumer interested in promotions within a pre-specified price range. For example, a consumer may be identified as a consumer that is likely interested in promotions costing less than $20. Attributes corresponding to such data may also be used for predicting consumer behavior.

Additionally or alternatively, some implementations may include at least one of "years in file" indicating the number of years a consumer has been consumer. As described above, consumers may be divided into cohorts corresponding to (1) a time measure indicating how long a consumer was a customer of the promotional and marketing service, (2) the number of purchases made by the consumer during a first pre-specified period, and/or (3) the expected number of purchases to be made by the consumer during a second pre-specified period. Each cohort may utilize different attributes for predicting consumer behavior.

Similar attributes may be clustered, grouped, or aggregated. For example, attributes associated with locations or location based attributes may be grouped under header attribute "location." For example, a division attributes specifying a size of the division where the consumer resides and an attribute specifying a distance from a center of a city where a promotion is offered may be clustered under the location header attribute. Similarly, attributes associated with "historical data," "category & services of interest," "discretionary data," and/or "review/survey data" may each also be clustered and/or grouped under header attributes. In some implementations, one or more attributes under the same header may be combined. In other implementations, more granular attributes under a particular header may be added.

In some implementations, the header attributes are ranked according to the overall importance and effectiveness of the attributes belonging to the header attribute. In other implementations, each attribute is ranked independently, for each stage and for each cohort, as shown in FIGS. 11A-11D.

Below is a list of exemplary attributes for consumer behavior prediction:

'gb_life': Gross Bookings (GB) over entire lifetime
'gb_1yr': GB inpast year
'gb_qtr': GB in past quarter
'sub_cohort': subscription year
'act_cohort': activation (first purchase) year
'act_channel': activation channel (Local, Goods, or Other)
'days_to_order': days between subscription and first order
'goods_cohort': year of first goods purchase
'app_cohort': year of first app download
'mobile_device': type of mobile device (e.g. iPhone)
'n_local_subs': # of Local email subscriptions
'discretionary_data': discretionary consumer data
'subdiv_peer_group': subdivision peer group (e.g. city center vs suburbs)
'city_dist': distance from city center
'div_size': division size (tiny, small, medium, large, huge)
'n_deals': # deals in a 5-mile radius in past quarter
'n_hero_deals': # hero (high GB) deals in a 5-mile radius in past quarter
'n_cstix_1yr': # customer service tickets in the past year
'n_good': # good CS survey responses in past year
'n_bad': # bad CS survey responses in past year
'email_wait_minutes': max CS email wait in minutes in past quarter
'phone_wait_seconds': max CS phone wait in seconds in past quarter
'n_refunds_1yr': # refunds in past year
'es_email': email engagement score in past quarter
'n_emails_send': number of emails sent in past quarter
'es_app': app engagement score in past quarter
'avg_ship_time': average Goods shipping time
'n_platforms': # order platforms in the past year
'primary_order_platform': primary order platform in the past year
'pct_non_local': % orders non-Local in the past year
'goods_upward_trend': y-o-y Goods % upward trend flag (0/1)
'n_unredeemed': # unredeemed promotions
'gb_unredeemed'=GB in unredeemed promotions
'n_expired': # expired promotions
'pct_redeemed': % promotions redeemed
'avg_days_between': avg # days between purchase and redemption
'pct_wow': % promotions WOW deals (e.g. Starbucks)
'pct_incentive': % promotions from incentives
'unsub': 0/1 unsub_all status (1=unsubscribed from all emails)

'ords_per_sub': orders per subscriber in home division

'days_since_order': days since most recent order

These attributes and others may be computed periodically (e.g., daily, weekly, and monthly) for consumers. The clustered or the non-clustered attributes may be used to train a machine learning model. It should be understood that the selection of attributes or clusters of attributes for training machine learning models or for consumer behavior prediction processes can greatly affect the respective performance. In some implementations, attributes and/or clusters of attributes are selected based on statistical analysis. In some implementations, selection of the most significant attributes is based on one or more different attribute selection approaches. These approaches may be (1) forward selection, which is starting with the most significant attributes and incrementally adding a next significant attribute until the model is stable; (2) backward elimination, which starts with all the attributes and exclude the non-significant attributes one by one until the model is stable; (3) a combination of forward selection and backward elimination; and (4) checking the significance of the attribute by statistical model (regression). In one embodiment, each attribute selection approach may give a subset of significant attributes. The attributes that are not shown to be significant by one or more of the attribute selection approaches may be excluded from the model.

In some implementations, the consumer behavior prediction process is performed according to a random forest model. The model may operate by constructing multiple decision trees at training. Each decision tree may be based on different attributes. In some implementations, the random forest model output is the mode of classes or the most occurring class among all the trees of the random forest. In some implementations, the random forest model is trained with historical data associated with various attributes. In some implementations, different trained models may be utilized for different cohorts and/or stages. For example, each of stage 1 and stage 2 for each of cohorts 1-4 may be trained according to a different model. For example, each combination of stages and cohorts may be trained according to the attributes shown in FIGS. 11A-11D.

In some implementations, the number of cohorts is determined based on market analysis to provide a balance between model accuracy and system stress and/or feasibility. For example, models having a large number of cohorts may be very accurate. However, such models may take a significantly longer amount of time to train. Alternatively, increasing the number of cohorts over a particular threshold may result in no significant improvement in accuracy while significantly increasing the required training time. The top attributes for each cohort may be determined according to random forest machine learning algorithm. The top attributes may be updated frequently. For example, the top attribute may change frequently for a particular cohort. Accordingly, the top attributes for that particular cohorts may be updated frequently. In some implementations, the top attributes for all cohorts are updated every 3 month. In other implementations, the top attributes are updated monthly or yearly. In some implementations, testing may be performed to determine the effectiveness of attributes prior to updating the top attributes.

Figure 9A:
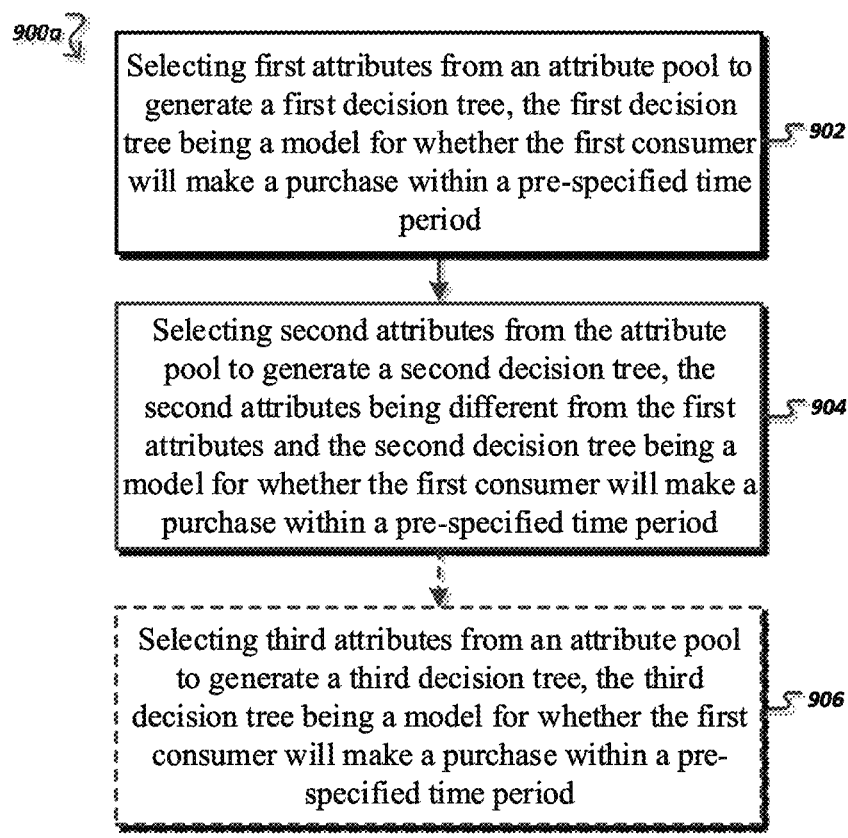
Figure 9B:
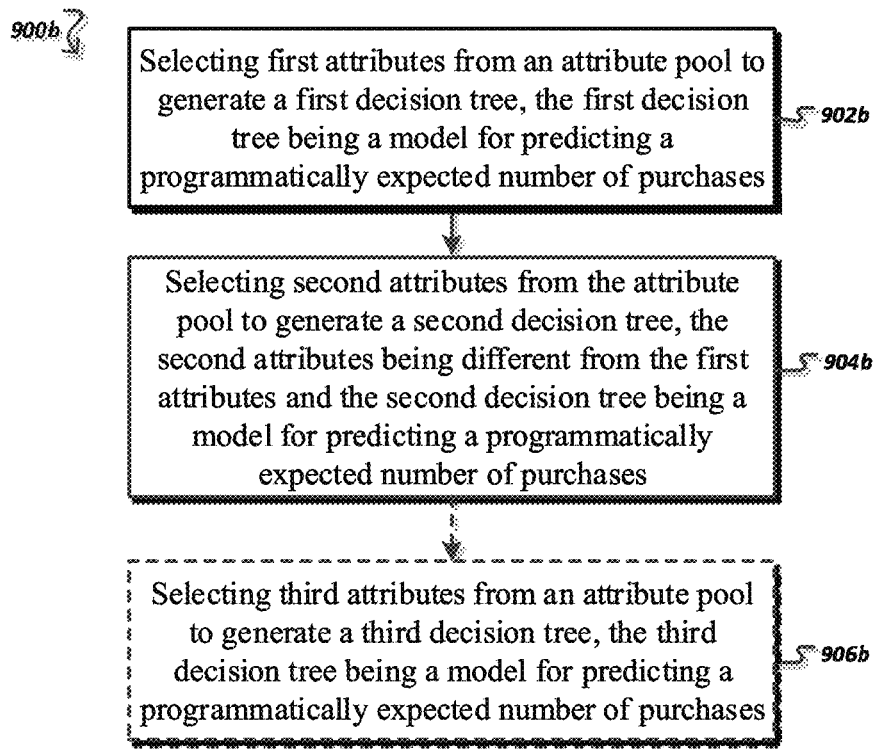

FIGS. 9A and 9B are flow charts of an example processes 900a and 900b for training a consumer behavior model based on selected attributes. The process 900a begins with selecting first attributes from an attribute pool to generate a first decision tree, the first decision tree being a model for whether the first consumer will make a purchase within a pre-specified time period (902). For example, the process 900a may select all "location" attributes and the "goods_cohort" attribute and/or other attributes or clusters of attributes. The selected first attributes are used to generate a decision tree for predicting whether the first consumer will make a purchase within a pre-specified time period. In some implementation, the selection is based on a machine learning algorithm. In some implementations, the attributes are selected based on statistical analysis of past performances. In some implementations, the pool of attributes comprises one or more of the list of exemplary attributes above. In some implementations, the selected attributes are different for different combinations of cohorts and stages.

The process 900a continues with selecting second attributes from the attribute pool to generate a second decision tree, the second attributes being different from the first attributes and the second decision tree being a model for whether the first consumer will make a purchase within a pre-specified time period (904). The second attributes are selected in a manner similar to step 902. In some implementations, the second attributes are different from the first attributes. The selected second attributes are then used to generate a second decision tree. In some implementations, the process 900a continues with optional step 906 shown in phantom. The process 900a may select third attributes from an attribute pool to generate a third decision tree, the third decision tree being a model for whether the first consumer will make a purchase within a pre-specified time period (906). In some implementations, the third attributes are different from the first and second attributes. In some implementations, the third attributes are then used to generate a decision tree. In some implementations, each generated tree is unique. In some implementations, additional trees are generated based on other selections of attributes. In some implementations, the process 900a may generate trees based on unique attribute selections until a threshold number of trees are generated. In some implementations, the process 900a may generate trees based on unique attribute selections until the prediction model is stable and accurate.

The process 900b is generally similar to 900a. However, process 900a is directed toward stage 1 and process 900b is directed towards stage 2. The process 900b begins with selecting first attributes from an attribute pool to generate a first decision tree, the first decision tree being a model for predicting a programmatically expected number of purchases (902b). For example, the process 900b may select the "goods_cohort" attribute and the "days_since_order" attribute and/or other attributes or clusters of attributes. The selected first attributes are used to generate a decision tree for predicting a programmatically expected number of purchases during a pre-specified period. In some implementation, the selection is based on a machine learning algorithm. In some implementations, the attributes are selected based on statistical analysis of past performances. In some implementations, the pool of attributes comprises one or more of the list of exemplary attributes above. In some implementations, the selected attributes are different for different combinations of cohorts and stages. In some implementations, the first attributes selected for process 900a (stage 1) is different from the first attributes selected for process 900b (stage 2). For example, the attributes shown in FIGS. 11A-11D may be selected for each respective stage and cohort combination.

The process 900b continues with selecting second attributes from the attribute pool to generate a second decision tree, the second attributes being different from the first attributes and the second decision tree being a model for predicting a programmatically expected number of purchases (904b). The second attributes are selected in a manner similar to step 902b. In some implementations, the second attributes are different from the first attributes. In some implementations the second attributes are different from the second attributes of process 900a. The selected second attributes are then used to generate a second decision tree. In some implementations, the process 900b continues with optional step 906b shown in phantom. The process 900b may select third attributes from an attribute pool to generate a third decision tree, the third decision tree being a model for predicting a programmatically expected number of purchases (906b). In some implementations, the third attributes are different from the first and second attributes and from all attributes of process 900a. In some implementations, the third attributes are then used to generate a decision tree. In some implementations, each generated tree is unique. In some implementations, additional trees are generated based on other selections of attributes. In some implementations, the process 900b may generate trees based on unique attribute selections until a threshold number of trees are generated. In some implementations, the process 900b may generate trees based on unique attribute selections until the prediction model is stable and accurate.

Figure 10A:
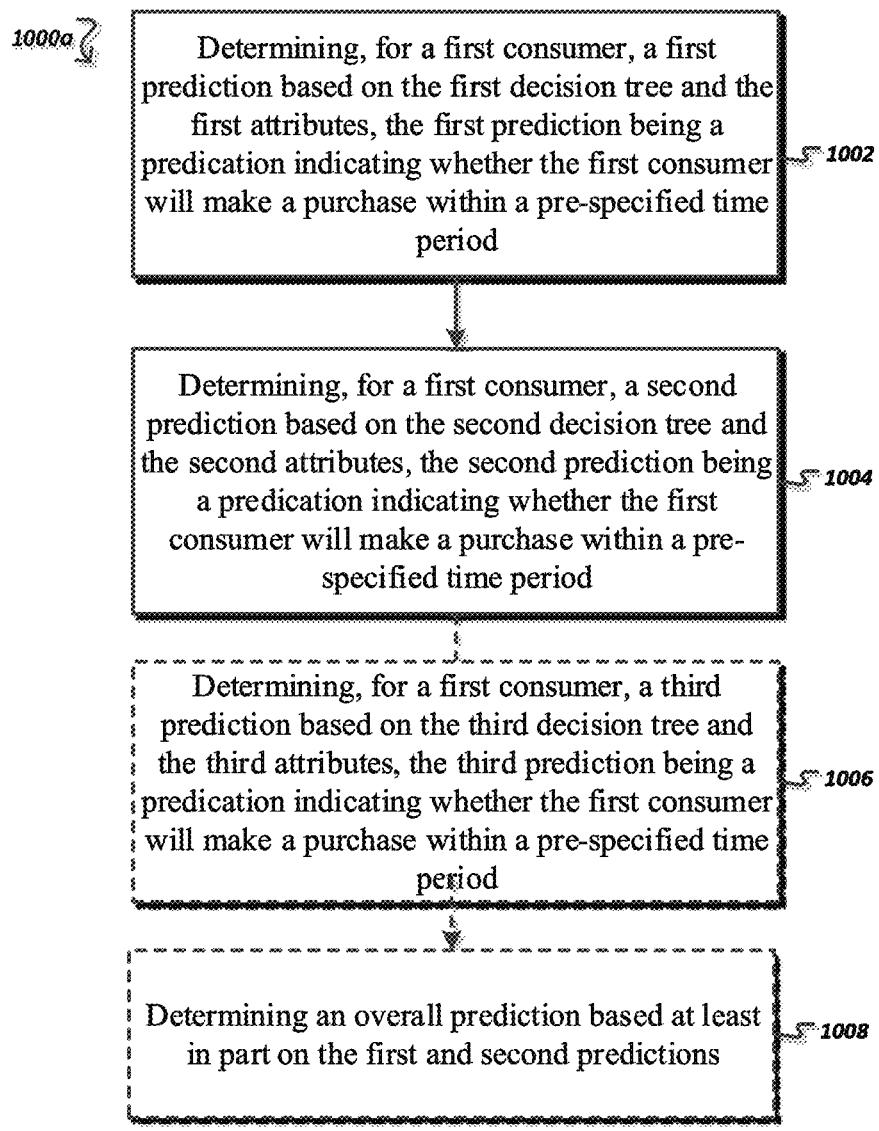
Figure 10B:
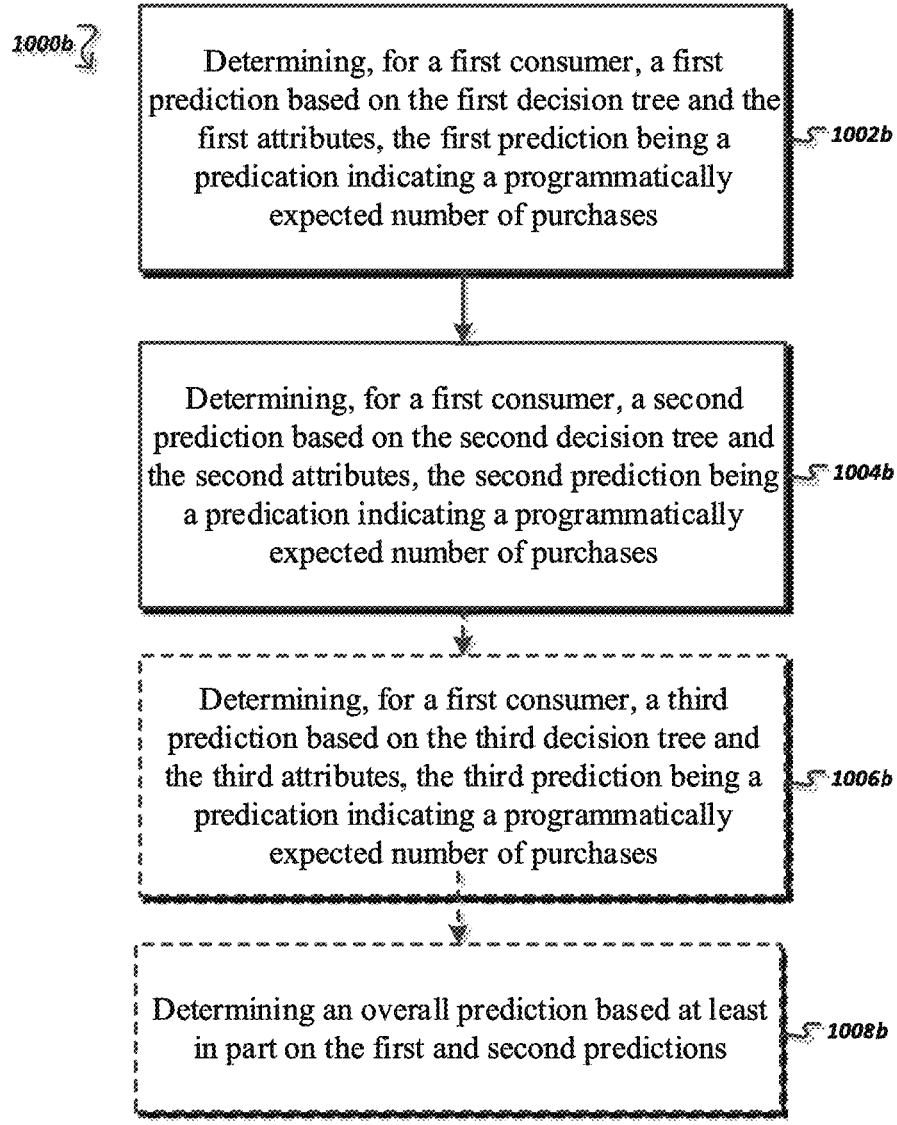

FIGS. 10A and 10B are flow charts of example process 1000a and 1000b for predicting consumer behavior, according to a model trained based on selected attributes. The process 1000a begins with determining, for a first consumer, a first prediction based on the first decision tree and the first attributes, the first prediction being a prediction indicating whether the first consumer will make a purchase within a pre-specified time period (1002). For example, the process 1000a may determine a first prediction specifying whether the first consumer will make a purchase within a pre-specified time period based on the "location" attributes and the "goods_cohort" attribute and/or other attributes or clusters of attributes. For example, the first prediction may indicate that a particular consumer will make a purchase during an upcoming 6 month period.

The process 1000a continues with determining, for a first consumer, a second prediction based on the second decision tree and the second attributes, the second prediction being a prediction indicating whether the first consumer will make a purchase within a pre-specified time period (1004). For example, the second prediction may also predict that the particular consumer will make a purchase during an upcoming 6 month period. In some implementations, the process 1000a may continue with determining, an overall prediction based at least in part on the first, and second predictions (1008). For example, since both the first and second predictions indicate that the particular consumer will make a purchase during the upcoming 6 months, the overall prediction may be that the consumer will make a purchase during the upcoming 6 months, because the mode of the first and second predictions is such.

In some implementations, the process 1000a includes optional step 1006 shown in phantom. The process 1000 may determine, for a first consumer, a third prediction based on the third decision tree and the third attributes, the third prediction being a prediction indicating whether the first consumer will make a purchase within a pre-specified time period (1008). In such implementations, the process 1000 includes the third prediction in determining the mode of the prediction trees. In some implementations, the additional predictions of additional trees may also be used to calculate the mode. In turn, the prediction for the first consumer is determined according to the mode. For example, out of five total predictions, if the first, third and fourth predictions indicated that the consumer will not make a purchase during the upcoming 6 month period, while the second and fifth predictions indicated that the first consumer will make a purchase during that 6 month period, then the overall prediction would be that first consumer will not make a purchase during the 6 month period.

The process 1000b is generally similar to the process 1000. The process 1000b begins with determining, for a first consumer, a first prediction based on the first decision tree and the first attributes, the first prediction being a prediction indicating a programmatically expected number of purchases (1002b). For example, the process 1000b may determine a first prediction specifying programmatically expected number of purchases within a pre-specified time period based on the "days_since_order" attribute and the "goods_cohort" attribute and/or other attributes or clusters of attributes. For example, the first prediction may indicate that a particular consumer will make 10 purchases during an upcoming 6 month period.

The process 1000b continues with determining for a first consumer, a second prediction based on the second decision tree and the second attributes, the second prediction being a prediction indicating a programmatically expected number of purchases (1004b). For example, the second prediction may predict that the particular consumer will make 2 purchases during an upcoming 6 month period. In some implementations, the process 1000b may continue with determining, an overall prediction based at least in part on the first, and second predictions (1008b). For example, since the first prediction indicated 10 purchases and the second predictions indicated 2 purchases for the particular consumer during the upcoming 6 months, the overall prediction may be 6 purchases during the upcoming 6 months, because the mode of the first and second predictions is such.

In some implementations, the process 1000b includes optional step 1006b shown in phantom. The process 1000b may determine, for a first consumer, a third prediction based on the third decision tree and the third attributes, the third prediction being a prediction indicating a programmatically expected number of purchases (1008b). In such implementations, the process 1000b includes the third prediction in determining the mode of the prediction trees. In some implementations, the additional predictions of additional trees may also be used to calculate the mode. In turn, the prediction for the first consumer is determined according to the mode.

Additional Implementation Details

Although an example processing system has been described in FIG. 2, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation

The invention claimed is:

1. A system, comprising a data processing apparatus and a computer memory apparatus in data communication with the data processing apparatus and storing instructions executable by the data processing apparatus and that upon such execution cause the data processing apparatus to:

receive data associated with a first consumer of a plurality of consumers;

determine a first classification for the first consumer, wherein the first classification represents a first cohort of a plurality of cohorts to which the first consumer belongs and is based at least in part on a measure of frequency of historical purchases by the first consumer;

identify one or more first attributes of a plurality of attributes based on attributes associated with the first cohort, the one or more first attributes being attributes selected for predicting respective one or more metrics associated with the first consumer, wherein a set of attributes for each cohort of the plurality of cohorts identified as having highest measures of importance for predicting a given metric relative to other attributes for each cohort is determined according to a first trained machine learning model comprising a random forest model, wherein each decision tree of the random forest model comprises unique attributes of the plurality of attributes relative to other decision trees of the random forest model, and wherein the given metric is a prediction as to whether the first consumer will make a purchase within a pre-specified time period;

select a second trained machine learning model based on the first cohort, the second machine learning model comprising a plurality of decision trees generated based on the one or more first attributes associated with the first cohort, wherein each decision tree of the plurality of decision trees comprises unique attributes of the one or more first attributes relative to other decision trees of the plurality of decision trees;

determine, based on applying the second trained machine learning model to values specific to the first consumer for the one or more first attributes, a first prediction value that indicates a programmatically expected number of future purchases by the first consumer; and transmit, to a first consumer device associated with the first consumer, one or more promotions renderable for display by the first consumer device, wherein the one or more promotions are selected based at least in part on the first prediction value.

2. The system of claim 1, wherein the identified one or more first attributes comprise one or more attributes indicating one or more engagement scores for the first consumer.

3. The system of claim 2, wherein the identified one or more first attributes comprise one or more attributes corresponding to emails transferred between the first consumer and a promotional and marketing service.

4. The system of claim 1, wherein the computer memory apparatus in data communication with the data processing apparatus stores instructions executable by the data processing apparatus and that upon such execution further cause the data processing apparatus to:

receive data associated with a second consumer of the plurality of consumers, the second consumer being different from the first consumer;

determine a second classification for the second consumer, wherein the second classification represents a second cohort of the plurality of cohorts to which the second consumer belongs and is based on a measure of frequency of purchases by the second consumer, and wherein the second classification of the second consumer is different from the first classification of the first consumer;

identify one or more second attributes based on attributes associated with the second cohort, the one or more second attributes being attributes selected for predicting the respective one or more metric associated with the second consumer;

determine, based on values specific to the second consumer for the one or more second attributes and using a third trained machine learning model associated with the second cohort, a second prediction value that indicates a programmatically expected number of purchases by the second consumer, wherein the second prediction value is different from the first prediction value; and transmit, to a second consumer device associated with the second consumer, one or more promotions renderable for display by the second consumer device, wherein the one or more promotions are selected based at least in part on the second prediction value.

5. The system of claim 4, wherein the computer memory apparatus in data communication with the data processing apparatus stores instructions executable by the data processing apparatus and that upon such execution further cause the data processing apparatus to:
determine a fourth prediction specifying an expected number of sales for a seller during a pre-specified period of time based, at least in part, on the first prediction and the second prediction.

6. The system of claim 4, wherein the computer memory apparatus in data communication with the data processing apparatus stores instructions executable by the data processing apparatus and that upon such execution further cause the data processing apparatus to:
transmit a promotion for display to a first consumer device associated with the first consumer and not transmit a promotion for display to a second consumer device associated with the second consumer, based, at least in part, on the first prediction and the second prediction.

7. The system of claim 4, wherein the computer memory apparatus in data communication with the data processing apparatus stores instructions executable by the data processing apparatus and that upon such execution further cause the data processing apparatus to:
transmit promotions to the first consumer at a different rate from a rate at which promotions are transmitted to the second consumer, based, at least in part, on the first prediction and the second prediction.

8. The system of claim 1, wherein the computer memory apparatus in data communication with the data processing apparatus stores instructions executable by the data processing apparatus and that upon such execution further cause the data processing apparatus to:
apply a decay factor to the first prediction value, the first decay factor being a factor that proportionally reduces the first prediction value, wherein the first decay factor is determined based on a measure of time lapsed between a time of the determination of the first prediction value and a time when the decay factor is applied.

9. The system of claim 8, wherein the historical data comprises data associated with consumers classified with a same classification as the first consumer.

10. The system of claim 1, wherein the computer memory apparatus in data communication with the data processing apparatus stores instructions executable by the data processing apparatus and that upon such execution further cause the data processing apparatus to:
receive updated first values specific to the first consumer for the one or more first attributes;
determine that a first event associated with the first consumer occurred;
in response to determining that the first event occurred, determine based on the updated first values for the one or more first attributes, an updated prediction value that indicates an updated programmatically expected number of purchases by the first consumer; and
transmit, to the first consumer device associated with the first consumer, one or more updated promotions renderable for display by the first consumer device, wherein the one or more updated promotions are selected based at least in part on the updated prediction value.

11. The system of claim 1, wherein the computer memory apparatus in data communication with the data processing apparatus stores instructions executable by the data processing apparatus and that upon such execution further cause the data processing apparatus to:
determine, based on values specific to the first consumer of third attributes different from the first attributes, a third prediction specifying whether the first consumer will make a purchase within a pre-specified time period, wherein the determining of the first prediction value is in response to determining that third prediction indicates that the consumer will make a purchase within the pre-specified time period.

12. The system of claim 1, wherein one or more of the first trained machine learning model or second trained machine learning model comprises a random forest model.

13. The system of claim 1, wherein the identified one or more first attributes comprise one or more attributes corresponding to historical data associated with the first consumer.

14. The system of claim 1, wherein the identified one or more first attributes comprise one or more attributes corresponding to location data.

15. The system of claim 1, wherein consumers that made a single purchase during a previous year are classified as belonging to a one time buyer cohort, consumers that made two purchases during a previous year are classified as belonging to a sporadic buyer cohort, consumers that made a minimum of three purchases and a maximum of seven purchases during a previous year are classified as belonging to a loyal buyer cohort, and consumers that made eight or more purchases during a previous year are classified as belonging to a power buyer cohort.

16. The system of claim 1, wherein the one or more metrics comprise one or more of a consumer lifetime value or a cohort recall percentage.

17. A system, comprising a data processing apparatus and a computer memory apparatus in data communication with the data processing apparatus and storing instructions executable by the data processing apparatus and that upon such execution cause the data processing apparatus to:
receive data associated with a first consumer of a plurality of consumers;
determine a first classification for the first consumer, wherein the first classification represents a first cohort of a plurality of cohorts to which the first consumer belongs and is based at least in part on a measure of frequency of historical purchases by the first consumer, wherein a set of attributes for each cohort of the plurality of cohorts identified as having highest measures of importance for predicting a given metric relative to other attributes for each cohort is determined according to a first trained machine learning model comprising a random forest model, wherein each decision tree of the random forest model comprises unique attributes of the plurality of attributes relative to other decision trees of the random forest model, and wherein the given metric is a prediction as to whether the first consumer will make a purchase within a pre-specified time period;
identify a set of attributes based on attributes associated with the first cohort, the set of attributes being attributes selected, for the first cohort, for predicting respective one or more metric associated with consumers associated with the first cohort;
select from the set of attributes a first subset of attributes and a second subset of attributes, wherein the first subset of attributes is different from the second subset of attributes;

select a second trained machine learning model based on the first cohort, the second machine learning model comprising a plurality of decision trees generated based on the one or more first attributes associated with the first cohort, wherein each decision tree of the plurality of decision trees comprises unique attributes of the one or more first attributes relative to other decision trees of the plurality of decision trees;

determine, based on applying the second trained machine learning model to values specific to the first consumer for the first subset of attributes, a first prediction value that indicates whether the first consumer will make a purchase within a pre-specified time period;

determine, based on applying the second trained machine learning model to values specific to the first consumer for the second subset of attributes, a second prediction value that indicates whether the first consumer will make a purchase within a pre-specified time period;

determine an overall prediction value based at least in part on the first and second predictions; and transmit, to a first consumer device associated with the first consumer, one or more promotions renderable for display by the first consumer device, wherein the one or more promotions are selected based at least in part on the overall prediction value.

18. The system of claim 17, wherein the overall prediction value is a mode of the first prediction value and second prediction value.

19. The system of claim 17, wherein the overall prediction value is further based on a third prediction value, the third prediction value being based on values for a third subset of attributes and indicating a programmatically expected number of purchases by the first consumer, wherein the third subset of attributes is different from the first and the second subsets of attributes.

20. A system, comprising a data processing apparatus and a computer memory apparatus in data communication with the data processing apparatus and storing instructions executable by the data processing apparatus and that upon such execution cause the data processing apparatus to:

receive data associated with a first consumer of a plurality of consumers;

determine a first classification for the first consumer, wherein the first classification represents a first cohort of a plurality of cohorts to which the first consumer belongs and is based at least in part on a measure of frequency of historical purchases by the first consumer, wherein a set of attributes for each cohort of the plurality of cohorts identified as having highest measures of importance for predicting a given metric relative to other attributes for each cohort is determined according to a first trained machine learning model comprising a random forest model, wherein each decision tree of the random forest model comprises unique attributes of the plurality of attributes relative to other decision trees of the random forest model, and wherein the given metric is a prediction as to whether the first consumer will make a purchase within a pre-specified time period;

identify a set of attributes based on attributes associated with the first cohort, the set of attributes being attributes selected, for the first cohort, for predicting respective one or more metric associated with consumers associated with the first cohort;

select from the set of attributes a first subset of attributes and a second subset of attributes, wherein the first subset of attributes is different from the second subset of attributes;

select a second trained machine learning model based on the first cohort, the second machine learning model comprising a plurality of decision trees generated based on the one or more first attributes associated with the first cohort, wherein each decision tree of the plurality of decision trees comprises unique attributes of the one or more first attributes relative to other decision trees of the plurality of decision trees;

determine, based on applying the second trained machine learning model to values specific to the first consumer for the first subset of attributes, a first prediction value that indicates a programmatically expected number of purchases by the first consumer;

determine, based on applying the second trained machine learning model to values specific to the first consumer for the second subset of attributes, a second prediction value that indicates a programmatically expected number of purchases by the first consumer;

determine an overall prediction value based at least in part on the first and second predictions; and transmit, to a first consumer device associated with the first consumer, one or more promotions renderable for display by the first consumer device, wherein the one or more promotions are selected based at least in part on the overall prediction value.

* * * * *